(12) United States Patent
Kato et al.

(10) Patent No.: US 8,204,747 B2
(45) Date of Patent: Jun. 19, 2012

(54) EMOTION RECOGNITION APPARATUS

(75) Inventors: Yumiko Kato, Osaka (JP); Takahiro Kamai, Kyoto (JP); Yoshihisa Nakatoh, Kyoto (JP); Yoshifumi Hirose, Kyoto (JP)

(73) Assignee: Panasonic Corporation, Osaka (JP)

( * ) Notice: Subject to any disclaimer, the term of this patent is extended or adjusted under 35 U.S.C. 154(b) by 894 days.

(21) Appl. No.: 11/997,458

(22) PCT Filed: May 21, 2007

(86) PCT No.: PCT/JP2007/060329
§ 371 (c)(1),
(2), (4) Date: Jan. 31, 2008

(87) PCT Pub. No.: WO2007/148493
PCT Pub. Date: Dec. 27, 2007

(65) Prior Publication Data
US 2009/0313019 A1    Dec. 17, 2009

(30) Foreign Application Priority Data
Jun. 23, 2006    (JP) ................................. 2006-173937

(51) Int. Cl.
*G10L 15/04*    (2006.01)
(52) U.S. Cl. .. 704/254; 704/243; 704/270; 704/E15.025
(58) Field of Classification Search ................. 704/254, 704/243, 270, E15.025
See application file for complete search history.

(56) References Cited

U.S. PATENT DOCUMENTS

| | | | |
|---|---|---|---|
| 5,987,415 A * | 11/1999 | Breese et al. ................ | 704/270 |
| 6,014,617 A | 1/2000 | Kawahara | |
| 6,151,571 A * | 11/2000 | Pertrushin ................ | 704/209 |
| 6,185,534 B1 * | 2/2001 | Breese et al. ................ | 704/270 |
| 6,212,502 B1 * | 4/2001 | Ball et al. ................ | 704/270 |
| 6,275,806 B1 * | 8/2001 | Pertrushin ................ | 704/272 |

(Continued)

FOREIGN PATENT DOCUMENTS
EP    1391876 A1 *    2/2004
(Continued)

OTHER PUBLICATIONS

Ishi et al. "Proposal of Acoustic Measures for Automatic Detection of Vocal Fry" 2005.*

(Continued)

*Primary Examiner* — Richemond Dorvil
*Assistant Examiner* — Greg Borsetti
(74) *Attorney, Agent, or Firm* — Wenderoth, Lind & Ponack, L.L.P.

(57) ABSTRACT

An emotion recognition apparatus performs accurate and stable speech-based emotion recognition, irrespective of individual, regional, and language differences of prosodic information. The emotion recognition apparatus includes: a speech recognition unit which recognizes types of phonemes included in the input speech; a characteristic tone detection unit which detects a characteristic tone that relates to a specific emotion, in the input speech; a characteristic tone occurrence indicator computation unit which computes a characteristic tone occurrence indicator for each of the phonemes, based on the types of the phonemes recognized by the speech recognition unit, the characteristic tone occurrence indicator relating to an occurrence frequency of the characteristic tone; and an emotion judgment unit which judges an emotion of the speaker in a phoneme at which the characteristic tone occurs in the input speech, based on the characteristic tone occurrence indicator computed by the characteristic tone occurrence indicator computing unit.

10 Claims, 20 Drawing Sheets

U.S. PATENT DOCUMENTS

| | | | |
|---|---|---|---|
| 6,353,810 B1 * | 3/2002 | Petrushin | 704/236 |
| 6,427,137 B2 * | 7/2002 | Petrushin | 704/273 |
| 6,480,826 B2 * | 11/2002 | Pertrushin | 704/270 |
| 6,638,217 B1 * | 10/2003 | Liberman | 600/300 |
| 6,721,704 B1 * | 4/2004 | Strubbe et al. | 704/270 |
| 6,761,131 B2 * | 7/2004 | Suzuki | 119/174 |
| 6,970,820 B2 | 11/2005 | Junqua et al. | |
| 7,139,699 B2 * | 11/2006 | Silverman et al. | 704/206 |
| 7,222,075 B2 * | 5/2007 | Petrushin | 704/270 |
| 7,280,964 B2 * | 10/2007 | Wilson et al. | 704/251 |
| 7,340,393 B2 * | 3/2008 | Mitsuyoshi | 704/207 |
| 7,451,079 B2 * | 11/2008 | Oudeyer | 704/205 |
| 7,627,475 B2 * | 12/2009 | Petrushin | 704/270 |
| 7,664,627 B2 * | 2/2010 | Mitsuyoshi | 704/1 |
| 2002/0002464 A1 * | 1/2002 | Petrushin | 704/275 |
| 2002/0194002 A1 * | 12/2002 | Petrushin | 704/270 |
| 2003/0033145 A1 * | 2/2003 | Petrushin | 704/236 |
| 2003/0055654 A1 | 3/2003 | Oudeyer | |
| 2003/0078768 A1 * | 4/2003 | Silverman et al. | 704/206 |
| 2003/0182123 A1 * | 9/2003 | Mitsuyoshi | 704/270 |
| 2003/0221630 A1 * | 12/2003 | Suzuki | 119/174 |
| 2003/0229497 A1 * | 12/2003 | Wilson et al. | 704/270.1 |
| 2004/0023043 A1 | 2/2004 | Ishikawa et al. | |
| 2005/0246168 A1 * | 11/2005 | Campbell et al. | 704/214 |
| 2006/0069559 A1 * | 3/2006 | Ariyoshi et al. | 704/246 |
| 2006/0122834 A1 * | 6/2006 | Bennett | 704/256 |
| 2006/0167694 A1 * | 7/2006 | Mitsuyoshi | 704/270 |
| 2007/0162283 A1 * | 7/2007 | Petrushin | 704/255 |
| 2007/0192108 A1 * | 8/2007 | Konchitsky | 704/270 |
| 2008/0052080 A1 * | 2/2008 | Narayanan | 704/270 |
| 2008/0059158 A1 * | 3/2008 | Matsuo et al. | 704/221 |
| 2008/0270123 A1 * | 10/2008 | Levanon et al. | 704/200.1 |
| 2009/0210220 A1 * | 8/2009 | Mitsuyoshi et al. | 704/207 |
| 2010/0217595 A1 * | 8/2010 | Kim et al. | 704/250 |

FOREIGN PATENT DOCUMENTS

| | | |
|---|---|---|
| EP | 1300831 B1 * | 12/2005 |
| EP | 1 796 347 | 6/2007 |
| JP | 9-022296 | 1/1997 |
| JP | 10-197575 | 7/1998 |
| JP | 11-119791 | 4/1999 |
| JP | 2001-083984 | 3/2001 |
| JP | 2003-099084 | 4/2003 |
| JP | 2003-210833 | 7/2003 |
| JP | 2004-037989 | 2/2004 |
| JP | 2004-259238 | 9/2004 |
| JP | 2004-279436 | 10/2004 |
| JP | 2004-310034 | 11/2004 |
| JP | 2005-039501 | 2/2005 |
| JP | 2005-283647 | 10/2005 |
| JP | 2005-348872 | 12/2005 |
| JP | 2006-071936 | 3/2006 |
| JP | 2006-106711 | 4/2006 |
| WO | 2006/028223 | 3/2006 |

OTHER PUBLICATIONS

Lee et al. "Emotion Recognition based on Phoneme Classes" 2004.*
Kwon et al. "Emotion Recognition by Speech Signals" 2003.*
Hashizawa et al. "On the Differences in Prosodic Features of Emotional Expression in Japanese Speech according to the Degree of the Emotion" 2004.*
Petrushin. "Emotion Recognition in Speech Signal: Experimental Study, Development, and Application" 2000.*
Lee et al. "Combining Acoustic and Language Information for Emotion Recognition" 2002.*
Hirose et al. "Analytical and Perceptual Study on the Role of Acoustic Features in Realizing Emotional Speech" 2000.*
Ververidis et al. "Emotional speech recognition: Resources, features, and methods" Apr. 2006.*
Sim et al. "Emotion Recognition Based on Frequency Analysis of Speech Signal" 2002.*
Hamzah et al. "Analysis of Prosodic Features of Emotional Expressions in Noh Farce ("Kyohgen") Speech according to the Degree of Emotion" 2004.*
International Search Report issued Aug. 21, 2007 in the International (PCT) Application of which the present application is the U.S. National Stage.
Kasuya Hideki et al., "Voice Quality Associated with Voice Source", The Journal of the Acoustical Society of Japan, vol. 51, No. 11, (1995), pp. 869-875 (and an English translation of p. 870, line 60-p. 871, line 20; p. 871, lines 28-35; p. 871, line 74-p. 72, line 1; and Figure 1).
Z. Wang et al., "Speech Emotion Recognition by Performing Parameter effectiveness Analysis Using Fuzzy Entropy," Journal of Circuits and Systems, vol. 8, No. 3, Jun. 2003, pp. 109-112 (with English translation).

* cited by examiner

FIG. 3A (It will take about ten minutes.)

Ju p pu n ho do ka ka ri ma su

| | Ju | p | pu | n | ho | do | ka | ka | ri | ma | su |
|---|---|---|---|---|---|---|---|---|---|---|---|
| Actual pressed voice position | | | | | | | ■ | | | | |
| Pressed voice occurrence indicator | -1.99 | -0.05 | -1.24 | -1.15 | -0.67 | 0.73 | 1.57 | 1.23 | -0.96 | 1.13 | -0.36 |
| Pressed voice occurrence probability | Low | Low | Low | Low | Low | Medium | High | High | Low | High | Low |
| Actual husky voice position | | | | | ■ | | | | | | |
| Husky voice occurrence indicator | -0.66 | -0.48 | 0.13 | -0.01 | 2.26 | -1.19 | 1.07 | 1.61 | -0.51 | 0.58 | 0.58 |
| Husky voice occurrence probability | Low | Low | Low | Low | High | Low | Medium | High | Low | Medium | Medium |

FIG. 3B (It has become hot.)

A ta ta ma ri ma shi ta

| | A | ta | ta | ma | ri | ma | shi | ta |
|---|---|---|---|---|---|---|---|---|
| Actual pressed voice position | | | | | | | | |
| Pressed voice occurrence indicator | 1.51 | 0.79 | 0.91 | 0.93 | -0.85 | 1.08 | -0.99 | 0.47 |
| Pressed voice occurrence probability | High | Medium | High | High | Low | High | Low | Medium |
| Degree of anger | Weak | Medium | Weak | Weak | Weak | Strong | Weak | |

FIG. 8

Emotion strength computation rule storage unit ~114

| Pressed voice only | | |
|---|---|---|
| Indicator range | Pressed voice likelihood | Emotion strength of anger in input speech |
| 0.5 > | Low | Strong |
| 0.5 ≦, 0.9 > | Medium | Medium |
| 0.9 ≦ | High | Weak |
| Husky voice only | | |
| Indicator range | Husky voice likelihood | Emotion strength of cheerfulness/friendliness in input speech |
| 0.4 > | Low | Strong |
| ... | ... | ... |
| Pressed voice | | |
| Indicator range Pressed voice × husky voice | Likelihood of both pressed voice and husky voice | Emotion strength of high spirit/joy in input speech |
| 0.1 > | Low | Strong |
| 0.1 ≦, 0.5 > | Medium | Medium |
| 0.5 ≦ | High | Weak |
| ... | ... | ... |

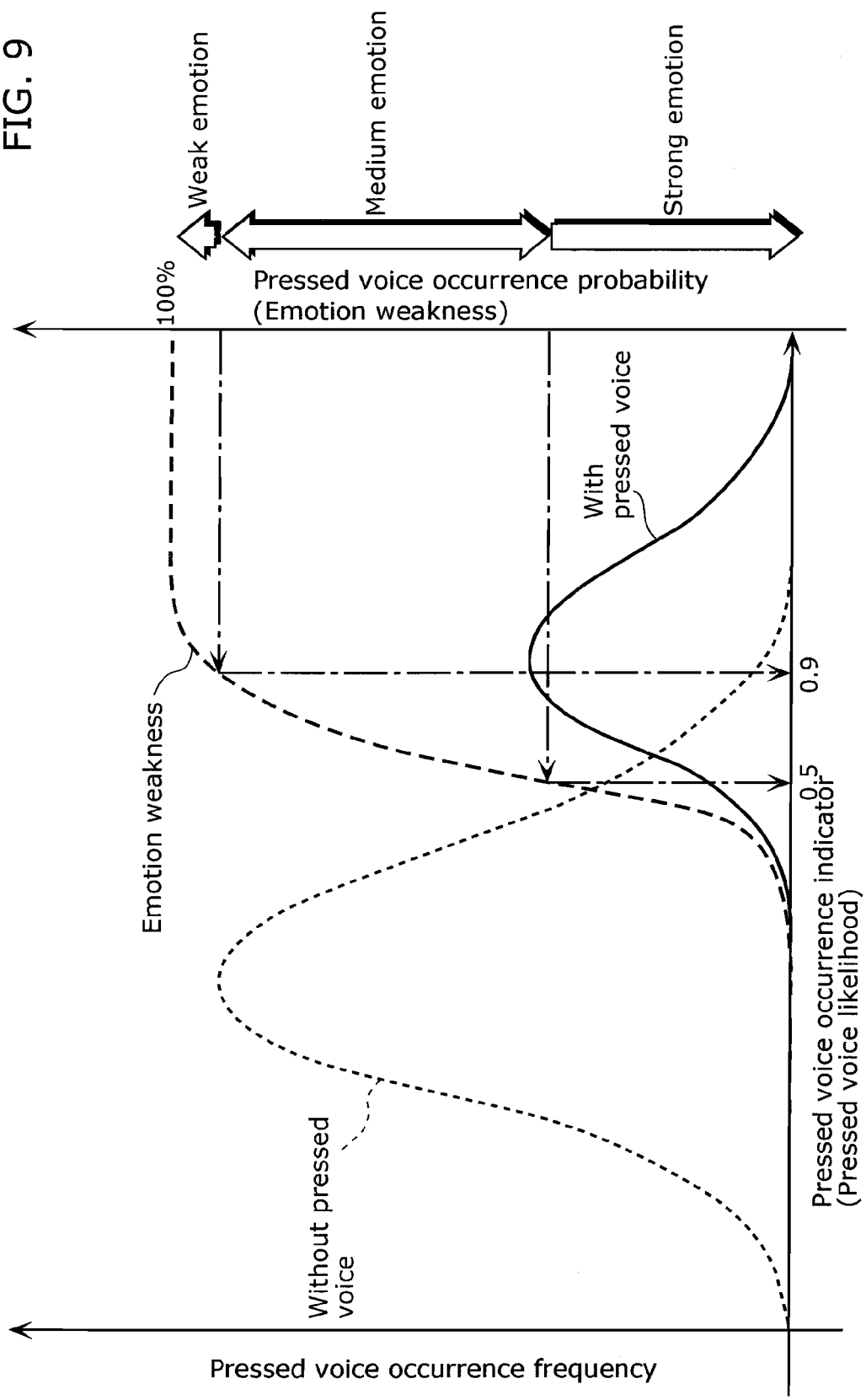

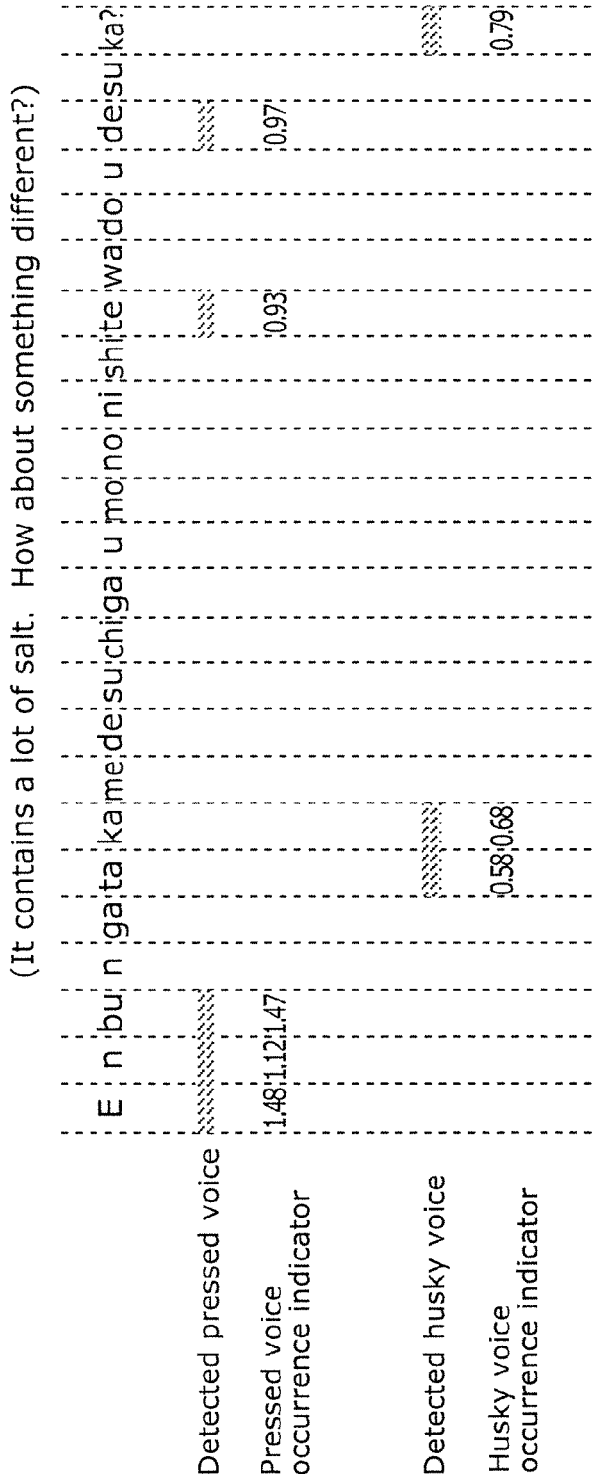

FIG. 13

Emotion type judgment rule storage unit — 132

| Difference in strength of characteristic tone included in input speech | Emotion | Strength |
|---|---|---|
| 2.0<(Pressed voice strength). (Pressed voice strength)<0.0 | Anger | Strong |
| 1.1<(Pressed voice strength)≦2.0 | Anger | Medium |
| 0.0<(Pressed voice strength)<1.1 | Anger | Weak |
| (Pressed voice strength)−(Husky voice strength)<−3.0 | Anger | Strong |
| −1.0>(Pressed voice strength)−(Husky voice strength)≧−3.0 | Anger | Medium |
| 0.0>(Pressed voice strength)−(Husky voice strength)≧−2.0 (Husky voice strength)<−1.0 | High spirit, joy | Weak |
| 1.0>(Pressed voice strength)−(Husky voice strength)≧−1.0 −1.0≦(Husky voice strength)<0.0 | High spirit, joy | Medium |
| 2.0>(Pressed voice strength)−(Husky voice strength)≧1.0 (Husky voice strength)<0.0 | High spirit, joy | Strong |
| ... | ... | ... |

FIG. 16A (I need a pencil to write names.)
Namae wo kaku <u>enpitsu ga</u> hoshii　n desu Pressed voice detected section

FIG. 16B (I need a chimney to write names.)
Namae wo kaku entotsu ga hoshii　n desu $\underbrace{\phantom{Namae wo kaku entotsu ga hoshii n desu}}_{a=0.9}$

(I need a chimney to write names.)
$W_1$=(Namae wo kaku entotsu ga hoshii　n desu)

(I need a pencil to write names.)
$W_2$=(Namae wo kaku enpitsu ga hoshii　n desu)
$\log P(Y/W_1) + 0.9 \times \log P(W_1) > \log P(Y/W_2) + 0.9 \times \log P(W_2)$

FIG. 16C (I need a pencil to write names.)

| i=1 | i=2 | i=3 | i=4 | i=5 | i=6 | i=7 | i=8 |
|---|---|---|---|---|---|---|---|
| Namae | wo | kaku | enpitsu | ga | hoshii | n | desu |

$\underbrace{\phantom{Namae wo kaku}}_{a=0.9}$ $\underbrace{\phantom{enpitsu ga}}_{a=2.3}$ $\underbrace{\phantom{hoshii n desu}}_{a=0.9}$

(I need a chimney to write names.)
$W_1$=(Namae wo kaku entotsu ga hoshii　n desu)

(I need a pencil to write names.)
$W_2$=(Namae wo kaku enpitsu ga hoshii　n desu)

$\log P(Y/W_1) + \sum_{i=1}^{n} a_i \log P(W_{1,i} | W_{1,1} \cdots W_{1,i-1})$
$< \log P(Y/W_2) + \sum_{i=1}^{n} a_i \log P(W_{2,i} | W_{2,1} \cdots W_{2,i-1})$ $W_{1,i}$ = i-th word in $W_1$
$W_{2,i}$ = i-th word in $W_2$ $a \begin{cases} 2.3 & i=4,5 \\ 0.9 & i \neq 4,5 \end{cases}$

EMOTION RECOGNITION APPARATUS

BACKGROUND OF THE INVENTION

1. Technical Field

The present invention relates to emotion recognition apparatuses for recognizing a speaker's emotion based on his or her speech. More specifically, the present invention relates to speech-based emotion recognition apparatuses for recognizing a speaker's emotion by detecting an occurrence of a characteristic tone in a speech, which is caused by tension or relaxation of a vocal organ that varies momentarily according to the speaker's emotion, expression, attitude, or speaking style.

2. Background Art

In an interactive system provided with a voice interactive interface, such as an automatic telephone answering system, an electronic secretary, and an interactive robot, it is an important requirement to perceive an emotion of a user from his or her speech, in order to respond to the user's request more appropriately. For example, when the aforementioned automatic telephone answering system or interactive robot communicates with the user by voice, the interactive system may not necessarily be able to correctly recognize the user's speech. In the case where the interactive system fails to correctly recognize the user's speech, the interactive system requests the user to input the speech again. In such a situation, the user may more or less get angry or frustrated. This becomes worse when the false recognition repeatedly occurs. The anger or frustration causes the user's way of speaking or voice quality to change, as a result of which the user's speech exhibits a different pattern from when he or she speaks in a normal state. This makes the interactive system, which stores the user's voice in the normal state as a model for recognition, more prone to false recognition. As a result, the interactive system makes even more annoying requests to the user, such as by requesting a same answer from the user again and again. When the interactive system falls into such a vicious circle, it becomes useless as an interactive interface.

To stop this vicious circle and normalize the device-user voice communication, it is necessary to recognize the user's emotion from his or her speech. That is, if the interactive system is capable of perceiving the user's anger or frustration, the interactive system can ask the user again more politely or apologize for the false recognition. By doing so, the interactive system can bring the user's emotion close to normal, and draw a normal-state speech from the user. As a result, a recognition rate can be recovered, and a device operation by the interactive system can be performed smoothly.

Conventionally, for speech-based emotion recognition, a method of extracting prosodic features such as a voice pitch (fundamental frequency), a volume (power), and a speech rate from a speech inputted by a speaker and recognizing an emotion based on a judgment such as "high-pitched" or "loud" for the entire input speech, has been proposed (for example, see Patent Document 1 and Patent Document 2). Also, a method of making a judgment such as "energy is high in a high frequency region" for an entire input speech, has been proposed (for example, see Patent Document 1). Further, a method of obtaining, from sequences of power and fundamental frequency of a speech, their statistical representative values such as a mean value, a maximum value, and a minimum value and recognizing an emotion has been proposed (for example, see Patent Document 3). Moreover, a method of recognizing an emotion by using a time pattern of prosody such as an intonation and an accent in a sentence or a word, has been proposed (for example, see Patent Document 4 and Patent Document 5).

FIG. 20 shows a conventional speech-based emotion recognition apparatus described in Patent Document 1.

A microphone 1 converts an input speech to an electrical signal. A speech code recognition unit 2 performs speech recognition on the speech inputted from the microphone 1, and outputs a recognition result to a sensitivity information extraction unit 3 and an output control unit 4.

Meanwhile, a speech rate detection unit 31, a fundamental frequency detection unit 32, and a volume detection unit 33 in the sensitivity information extraction unit 3 extract a speech rate, a fundamental frequency, and a volume from the speech inputted from the microphone 1, respectively.

A speech level judgment criterion storage unit 34 stores a criterion for comparing the speech rate, fundamental frequency, and volume of the input speech respectively with a reference speech rate, fundamental frequency, and volume and determining a speech level. A reference speech feature parameter storage unit 35 stores the reference speech rate, fundamental frequency, and volume that are used as a reference when judging the speech level. A speech level analysis unit 36 determines the speech level, that is, a speech rate level, a fundamental frequency level, and a volume level, based on a ratio between a feature parameter of the input speech and a reference speech feature parameter.

A sensitivity level analysis knowledge base storage unit 37 stores a rule for judging a sensitivity level according to each speech level determined by the speech level analysis unit 36. A sensitivity level analysis unit 38 judges the sensitivity level, that is, a sensitivity type and level, from the output of the speech level analysis unit 36 and the output of the speech code recognition unit 2, based on the rule stored in the sensitivity level analysis knowledge base storage unit 37.

The output control unit 4 generates an output corresponding to the sensitivity level of the input speech by controlling an output device 5, in accordance with the sensitivity level outputted from the sensitivity level analysis unit 38. Here, information used for determining the speech level includes a speech rate of how many morae are spoken per second, an average fundamental frequency, and other prosodic information obtained in a unit such as an utterance, a sentence, or a phrase.

However, prosodic information is also used for transferring linguistic information. Besides, a method of transferring such linguistic information differs between languages. For example, in Japanese, there are many homophones, such as "hashi" ("bridge") and "hashi" ("chopsticks"), that have different meanings depending on an accent formed by rise and fall in fundamental frequency. In Chinese, it is known that a same sound can represent completely different meanings (characters) depending on a change in fundamental frequency called four tones. In English, an accent is expressed by a voice emphasis called a stress rather than a fundamental frequency, where a position of the stress assists in distinguishing different meanings of a word or a phrase, or different word classes. To perform prosody-based emotion recognition, it is necessary to take such prosodic pattern differences among languages into consideration. Therefore, data for emotion recognition needs to be generated in a manner that separates prosodic changes as emotional expressions and prosodic changes as language information, for each language. Also, even in a same language, there are individual differences such as a person who speaks fast and a person who speaks in a high (or low) voice. This being so, in prosody-based emotion recognition, for example, a person who usually speaks loud and fast in a high voice will end up being always recognized to be angry. To prevent such wrong emotion recognition caused by individual differences, it is also necessary to perform emotion recognition tailored to each individual, by storing reference data for each individual and comparing a speech of each individual with corresponding reference data (for example, see Patent Document 2 and Patent Document 5).

Patent Document 1: Japanese Patent Application Publication No. H09-22296 (pp. 6 to 9, tables 1 to 5, FIG. 2)
Patent Document 2: Japanese Patent Application Publication No. 2001-83984 (pp. 4 to 5, FIG. 4)
Patent Document 3: Japanese Patent Application Publication No. 2003-99084
Patent Document 4: Japanese Patent Application Publication No. 2005-39501 (p. 12)
Patent Document 5: Japanese Patent Application Publication No. 2005-283647

As described above, prosody-based emotion recognition requires a large amount of voice data, analytical processing, and statistical processing, because variations in prosodic information used for expressing language information and variations in prosodic information as emotional expressions need to be separated for each language. Also, even in a same language, there are large regional differences, as well as individual differences attributable to age and the like. Besides, a voice of one person can greatly vary depending on his or her physical condition and the like. Therefore, without reference data corresponding to each user, it is difficult to always produce stable results for an indefinite number of people, since emotional expressions by prosody have large regional differences and individual differences.

Moreover, the method of preparing reference data for each individual cannot be employed in a system that is intended for use by an indefinite number of people, such as a call center or an information system in a public place like a station, because it is impossible to prepare reference data of each speaker.

Furthermore, prosodic data, which includes statistical representative values such as a number of morae per second, a mean value, and a dynamic range, or time patterns, need to be analyzed in a cohesive unit of voice such as an utterance, a sentence, or a phrase. Therefore, when a feature of a speech changes rapidly, it is difficult to perform the analysis so as to keep up with such a change. This causes a problem of being unable to perform speech-based emotion recognition with high accuracy.

The present invention was conceived to solve the above conventional problems, and aims to provide a speech-based emotion recognition apparatus that can detect an emotion in a small unit, namely, a phoneme, and perform emotion recognition with high accuracy by using a relationship between a characteristic tone which has relatively small individual, language, and regional differences and a speaker's emotion.

SUMMARY OF THE INVENTION

An emotion recognition apparatus according to an aspect of the present invention is an emotion recognition apparatus that recognizes an emotion of a speaker from an input speech, including: a characteristic tone detection unit which detects, in the input speech, a characteristic tone that relates to a specific emotion; a speech recognition unit which recognizes types of phonemes included in the input speech, based on the characteristic tone detected by the characteristic tone detection unit; a characteristic tone occurrence indicator computation unit which computes a characteristic tone occurrence indicator for each of the phonemes, based on the types of the phonemes recognized by the speech recognition unit, the characteristic tone occurrence indicator indicating a likelihood of the phoneme being spoken with the characteristic tone; and an emotion judgment unit which judges an emotion of the speaker in a phoneme at which the characteristic tone occurs in the input speech, using the characteristic tone occurrence indicator computed by the characteristic tone occurrence indicator computing unit, in accordance with a rule that the specific emotion is stronger when the characteristic tone occurrence indicator is smaller.

An occurrence mechanism of a physical feature of a voice is determined by a physiological factor of a vocal organ, as in the case of a plosive which tends to be produced with strained lips and tongue due to an operation of closing a vocal tract by lips, tongue, and palate and then suddenly releasing it. This being so, a characteristic tone, such as a falsetto voice, a pressed voice, or a breathy voice, which is observed in units of phonemes in a speech, can be detected as a result of a speaker's vocal organ being strained or relaxed according to his or her emotion or speaking attitude. Based on a detection result of this characteristic tone, the speaker's emotion can be recognized in units of phonemes, without being affected by language differences or individual and regional differences relating to speaker properties.

Preferably, the emotion recognition apparatus may further include an emotion strength judgment unit which judges a strength of the emotion of the speaker in the phoneme at which the characteristic tone occurs, in accordance with a computation rule that a strength of the specific emotion is greater when the characteristic tone occurrence indicator is smaller.

Moreover, the emotion strength judgment unit may: check a time position at which the characteristic tone detected by the characteristic tone detection unit occurs in the input speech, and the characteristic tone occurrence indicator computed for each of the phonemes by the characteristic tone occurrence indicator computation unit; and judge the strength of the emotion of the speaker in the phoneme at which the characteristic tone occurs, in accordance with the computation rule that the strength of the specific emotion is greater when the characteristic tone occurrence indicator is smaller.

When the characteristic tone occurs in a phoneme that is unlikely to be spoken with the characteristic tone, it can be considered that the specific emotion corresponding to the characteristic tone appears strongly. Based on this rule, the strength of the emotion can be judged accurately without being affected by language, individual, and regional differences.

Preferably, the emotion recognition apparatus may further include: an acoustic feature parameter database storing an acoustic feature parameter for each phoneme type; and a language feature parameter database storing a language feature parameter which represents a word dictionary including at least one of a reading and a pronunciation symbol, wherein the speech recognition unit recognizes the types of the phonemes included in the input speech based on the acoustic feature parameter database and the language feature parameter database by, for a word in which the characteristic tone is detected, decreasing a weight of the acoustic feature parameter included in the acoustic feature parameter database and increasing a weight of the language feature parameter included in the language feature parameter database.

By increasing the weight of the language feature parameter for a word in which the characteristic tone occurs, it is possible to prevent a drop in speech recognition accuracy caused by the acoustic feature parameter not matching in the occurrence position of the characteristic tone. As a result, the emotion can be recognized accurately.

Note that the present invention can be realized not only as an emotion recognition apparatus which includes the above characteristic units, but also as an emotion recognition method which includes steps corresponding to the characteristic units included in the emotion recognition apparatus, or as a program for causing a computer to execute the characteristic steps included in the emotion recognition method. Such a program can be distributed via a recording medium such as a CD-ROM (Compact Disc-Read Only Memory) or a communication network such as an internet.

The speech-based emotion recognition apparatus according to the present invention can detect a speaking mode that deviates from a normal speaking mode (a speech in a normal state) as a result of a vocal organ being strained or relaxed according to a speaker's emotion or speaking attitude. In detail, the speech-based emotion recognition apparatus according to the present invention can detect a characteristic tone showing a deviation value that deviates from a normal voice in a specific acoustic property, such as a falsetto voice, a pressed voice, or a breathy voice observed in units of phonemes in a speech. By using a detection result of this characteristic tone, the speaker's emotion can be recognized in units of phonemes without being affected by language differences or individual and regional differences relating to speaker properties, with it being possible to follow an emotional change in the speech.

BRIEF DESCRIPTION OF DRAWINGS

FIG. 3A shows a comparison between observed characteristic tone occurrence positions and estimated characteristic tone time positions, in a recorded speech.

FIG. 3B shows a comparison between observed characteristic tone occurrence positions and estimated characteristic tone time positions, in a recorded speech.

FIG. 8 shows one example of an emotion strength computation rule, according to the first embodiment of the present invention.

FIG. 9 represents a relationship between a pressed voice occurrence indicator and an occurrence frequency of each of a mora with a pressed voice and a mora without a pressed voice, and a relationship between the pressed voice occurrence indicator and an emotion strength (weakness).

FIG. 12 shows a comparison between observed characteristic tone occurrence positions and characteristic tone occurrence likelihoods, in a recorded speech.

FIG. 13 shows one example of an emotion type judgment rule according to the variation of the first embodiment of the present invention.

FIG. 16A shows a specific example of a speech recognition process according to the second embodiment of the present invention.

FIG. 16B shows the specific example of the speech recognition process according to the second embodiment of the present invention.

FIG. 16C shows the specific example of the speech recognition process according to the second embodiment of the present invention.

Figure 1A:
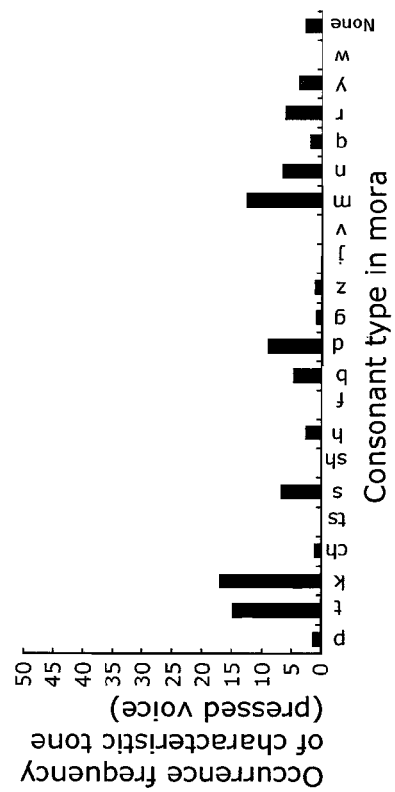
FIG. 1A is a graph showing, for each consonant in morae, an occurrence frequency of a mora spoken by speaker 1 with a pressed voice or a harsh voice in a speech which is accompanied by an emotional expression of strong anger.

NUMERICAL REFERENCES 1 microphone
2 speech code recognition unit
3 sensitivity information extraction unit
4 output control unit
5 output device
31 speech rate detection unit
32 fundamental frequency detection unit
33 volume detection unit
34 speech level judgment criterion storage unit
35 reference speech feature parameter storage unit
36 speech level analysis unit
37 sensitivity level analysis knowledge base storage unit
38 sensitivity level analysis unit
101 speech recognition feature parameter extraction unit
102 inverse filter
103 periodicity analysis unit 104 characteristic tone detection unit
105 feature parameter database
106 speech recognition unit
107 switch
108 characteristic tone occurrence phoneme specification unit
109 prosodic information extraction unit
110 characteristic tone occurrence indicator computation rule storage unit
111 characteristic tone occurrence indicator computation unit
112 emotion type judgment criterion storage unit
113 emotion type judgment unit
114 emotion strength computation rule storage unit
115 emotion strength computation unit
116 display unit
132 emotion type judgment rule storage unit
133 emotion type strength computation unit
205 acoustic feature parameter database
206 language feature parameter database
207 continuous word speech recognition unit

DETAILED DESCRIPTION OF THE INVENTION

First, a relationship between a characteristic tone in a speech and a speaker's emotion, which forms a basis of the present invention, is explained below using a phenomenon seen in an actual speech.

It is known that sounds of various voice qualities are mixed in speeches which are accompanied by emotions or expressions, where such voice qualities characterize the emotions or expressions of the speeches and form impressions of the speeches (for example, see Hideki Kasuya & Chang-Sheng Yang "Voice Quality Associated with Voice Source" in *The Journal of the Acoustical Society of Japan*, vol. 51, no. 11 (1995), pp. 869 to 875, and Japanese Patent Application Publication No. 2004-279436). Before describing the present invention, the following gives a result of a study on an expressionless speech and an emotional speech, for 50 sentences spoken based on a same text.

Figure 1B:
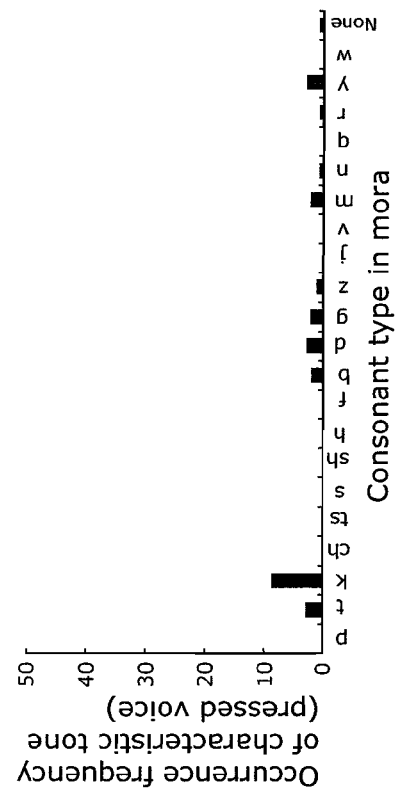
FIG. 1B is a graph showing, for each consonant in morae, an occurrence frequency of a mora spoken by speaker 2 with a pressed voice or a harsh voice in a speech which is accompanied by an emotional expression of strong anger.
Figure 1C:
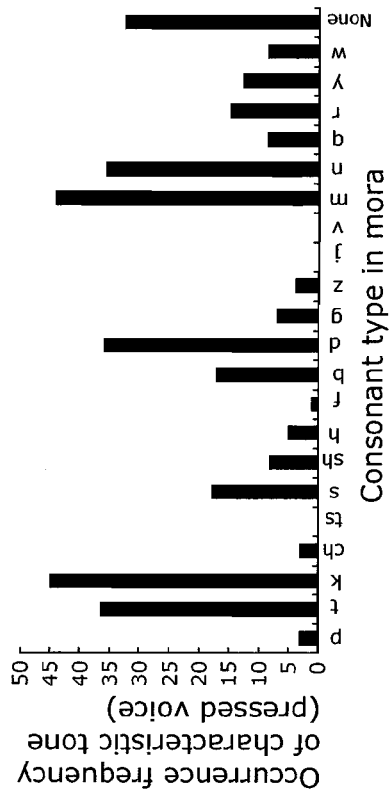
FIG. 1C is a graph showing, for each consonant in morae, an occurrence frequency of a mora spoken by speaker 1 with a pressed voice or a harsh voice in a speech which is accompanied by an emotional expression of moderate anger.
Figure 1D:
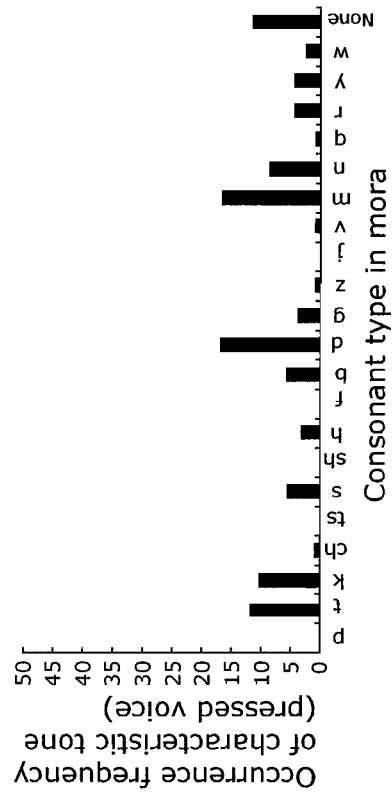
FIG. 1D is a graph showing, for each consonant in morae, an occurrence frequency of a mora spoken by speaker 2 with a pressed voice or a harsh voice in a speech which is accompanied by an emotional expression of moderate anger.

FIG. 1A is a graph showing, for each consonant in morae, an occurrence frequency of a mora spoken by speaker 1 with a pressed voice or a harsh voice in a speech which is accompanied by an emotional expression of strong anger. FIG. 1B is a graph showing, for each consonant in morae, an occurrence frequency of a mora spoken by speaker 2 with a pressed voice or a harsh voice in a speech which is accompanied by an emotional expression of strong anger. FIGS. 1C and 1D are graphs showing, for each consonant in morae, an occurrence frequency of a mora spoken respectively by the speakers of FIGS. 1A and 1B with a pressed voice or a harsh voice in a speech which is accompanied by an emotional expression of moderate anger.

The occurrence frequency of the characteristic tone varies depending on a consonant type of a mora. A common feature is seen in the two speakers shown in the graphs of FIGS. 1A and 1B. In detail, for each of the speakers, the occurrence frequency is high in the case of "t" (an unvoiced palatal plosive), "k" (an unvoiced velar plosive), "d" (a voiced palatal plosive), "m" (a labial nasal), "n" (a palatal nasal), or no consonant, and low in the case of "p" (an unvoiced labial plosive), "ch" (an unvoiced dental affricate), "ts" (an unvoiced affricate), "f" (an unvoiced labio-dental fricative), and the like. In other words, the graphs of FIGS. 1A and 1B indicate that a condition of an occurrence of a pressed voice in a speech which is accompanied by an angry emotion is common to the speakers. The occurrence of a pressed voice in the two speakers in FIGS. 1A and 1B exhibits a same tendency of variation according to a consonant type of a mora. Also, even when a speech is uttered with a same degree of angry emotion, a probability of being spoken with a pressed voice differs according to a phoneme type. In view of this, it can be estimated that the degree of angry emotion is higher when a pressed voice is detected in a type of phoneme which has a lower probability of being spoken with a pressed voice.

Next, compare FIGS. 1A and 1C that show the occurrence frequencies of the pressed voice characteristic tone for the same speaker 1. In the case of "sh" and "f", no pressed voice occurs in the expression of moderate anger shown in FIG. 1C, but a pressed voice occurs in the expression of strong anger shown in FIG. 1A. Also, in the case of a mora with no consonant, the occurrence frequency of a pressed voice is low in the expression of moderate anger shown in FIG. 1C, but the occurrence frequency of a pressed voice increases in the expression of strong anger shown in FIG. 1A. From this, it can be understood that a pressed voice occurs even in a phoneme that is usually unlikely to be spoken with a pressed voice, when a strength of anger increases. Here, as already shown with respect to speakers 1 and 2, the variation pattern of the probability of being spoken with a pressed voice according to a phoneme type is common to speakers.

Figure 2A:
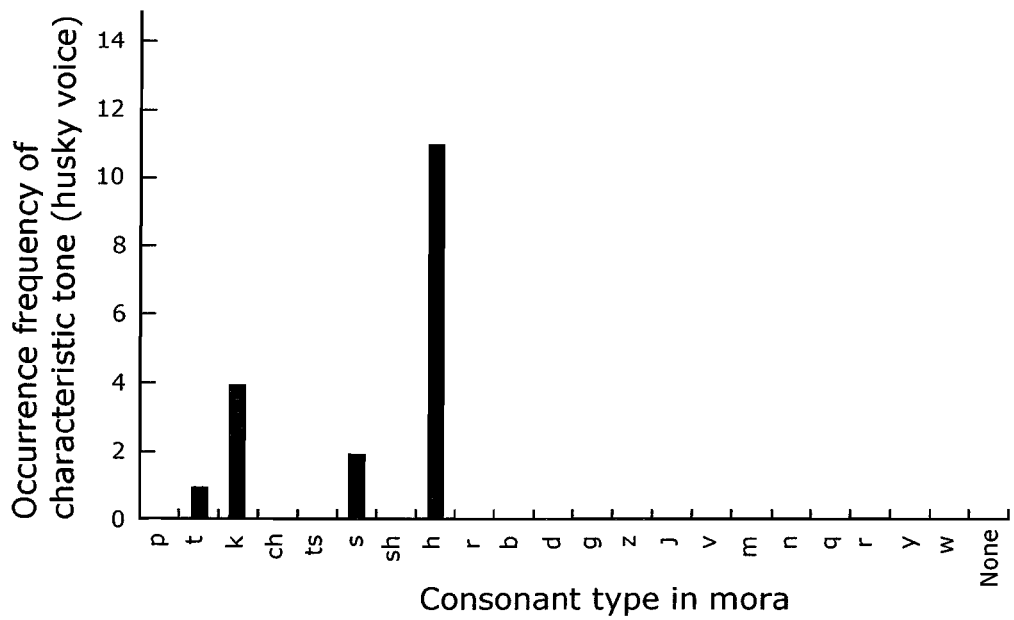
FIG. 2A is a graph showing, for each phoneme type, an occurrence frequency of a husky voice as a characteristic tone in a recorded speech of speaker 1.
Figure 2B:
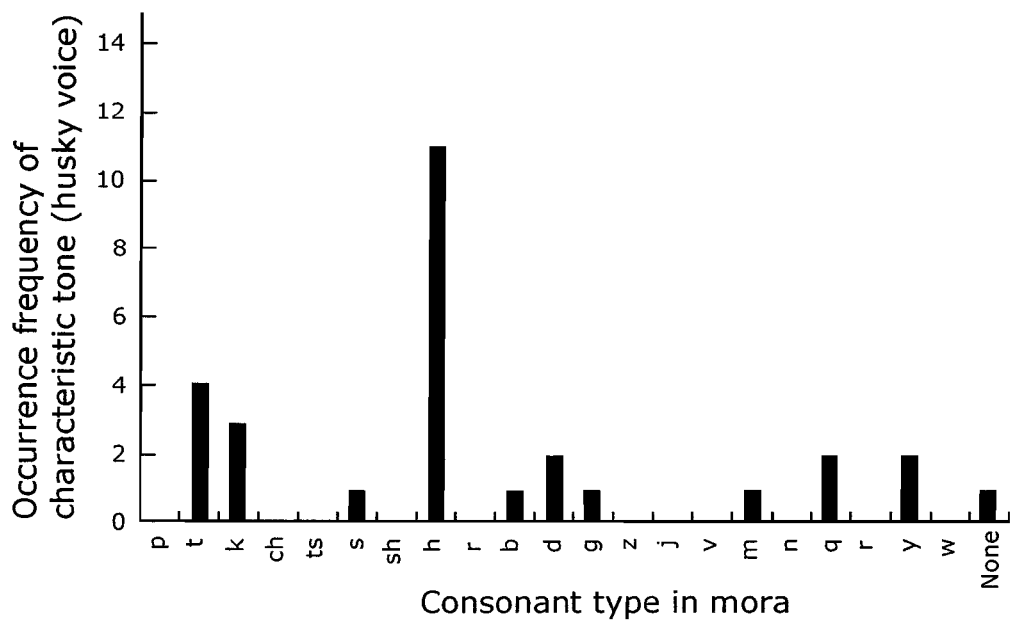
FIG. 2B is a graph showing, for each phoneme type, an occurrence frequency of a husky voice as a characteristic tone in a recorded speech of speaker 2.

FIGS. 2A and 2B are graphs showing, for each consonant in morae, an occurrence frequency of a mora spoken with a breathy voice, that is, a husky voice or a soft voice, in a pleasant speech which is accompanied by an emotional expression of cheerfulness. In detail, FIGS. 2A and 2B are graphs showing, for each consonant in morae, an occurrence frequency of a mora spoken respectively by speaker 1 and speaker 2 with a breathy voice, that is, a husky voice or a soft voice, in a pleasant speech which is accompanied by an emotional expression of cheerfulness. The occurrence frequency of the characteristic tone varies depending on a consonant type of a mora. A common feature is seen in the two speakers shown in the graphs of FIGS. 2A and 2B. Which is to say, for each of the speakers, the occurrence frequency is high in the case of "h" (an unvoiced glottal fricative) and "k" (an unvoiced velar plosive), and low in the case of "d" (a voiced palatal plosive), "m" (a labial nasal), "g" (a voiced velar plosive), and the like. Also, the occurrence frequency of the characteristic tone in the phonemes "b", "g", and "m" is 0 in speaker 1 shown in FIG. 2A, while the occurrence frequency of the characteristic tone in the phonemes "b", "g", and "m" is, though low, not 0 in speaker 2 shown in FIG. 2B. This tendency in which the occurrence frequency is 0 in one speaker and is not 0 in another speaker though it is low, is similar to the tendency of the phoneme "f" in FIGS. 1A to 1D (the occurrence frequency is low in speaker 1 shown in FIG. 1A but 0 in speaker 2 shown in FIG. 1B). Accordingly, it can be considered from FIGS. 2A and 2B that, when the strength of cheerfulness increases, a husky voice occurs in the phonemes "b", "g", and "m" that are usually unlikely to be spoken with a husky voice, as in the case of FIGS. 1A to 1D where, when the strength of anger increases, a pressed voice occurs in the phoneme "f" that is usually unlikely to be spoken with a pressed voice.

The aforementioned variation of the occurrence probability according to a phoneme type and the commonality of the variation pattern among speakers can be found not only in a pressed voice and a husky voice but also in a falsetto voice and a broken voice. A voice, such as a pressed voice, a husky voice, a falsetto voice, and a broken voice, that is uttered in a speaking mode which deviates from a normal speaking mode (a speech in a normal state) shows, for a specific acoustic property, a value that deviates from a voice uttered in the normal speaking mode. When a sufficiently large amount of voice data including various speaking modes are present, there is a case where a specific acoustic property value is statistically distributed away from distribution positions of many voices, as in an example of a time correlation between energy around a first formant and energy around a third formant of a breathy voice (husky voice) in Japanese Patent Application Publication No. 2004-279436. Such a distribution is observed in a specific speaking style or emotional expression. For instance, an acoustic property value of a breathy voice can be found to have a tendency of belonging to a voice expressing friendliness. In other words, there is a possibility that a type or state of a speaker's emotion or speaking attitude can be determined by extracting a pressed voice, a breathy (husky) voice described in Japanese Patent Application Publication No. 2004-279436, and a falsetto voice from an input speech. Furthermore, there is a possibility that a degree of the speaker's emotion or speaking attitude can be determined by specifying a phoneme at which such a characteristic tone is detected.

FIGS. 3A and 3B show results of estimating a pressed voice likelihood of each mora, i.e., a likelihood of each mora being spoken with a pressed voice, respectively in an input "Juppun hodo kakarimasu" ("It will take about 10 minutes") and an input "Atatamarimashita" ("It has become hot"), according to an estimate formula generated from the same data as in FIGS. 1A to 1D using quantification II which is one type of statistical learning method. For example, in "kakarimasu" in FIG. 3A, a pressed voice occurs only in morae having high occurrence probabilities. This indicates that the degree of anger is low. Likewise, in FIG. 3B, "Atatama" has high or medium occurrence probabilities of a pressed voice and so the degree of anger is low to medium, whilst "ri" has a low occurrence probability of a pressed voice and so the degree of anger is high. In this example, for each mora in learning data, information showing a phoneme type such as a phoneme category or a type of a consonant and vowel included in the mora, information about a position of the mora in an accent phrase, and information about preceding and succeeding phonemes are used as independent variables. Also, two values of whether or not a pressed voice or a harsh voice occurs are used as a dependent variable. The example represents a result of generating an estimate formula using quantization II and dividing occurrence probabilities into three levels of low, medium, and high, based on these independent and dependent variables. The example demonstrates that a degree of a speaker's emotion or speaking attitude can be determined by computing a characteristic tone occurrence probability for each mora in an input speech by using a speech recognition result.

By using, as an indicator of an emotion type and strength, a type and degree of an emotion or speaking attitude obtained through the use of an occurrence probability of a characteristic tone which depends on a physiological trait at the time of speaking, emotion judgment can be performed accurately, with there being little influences of language, region (dialect), and individual differences.

The following describes embodiments of the present invention, with reference to drawings.

First Embodiment

Figure 4:
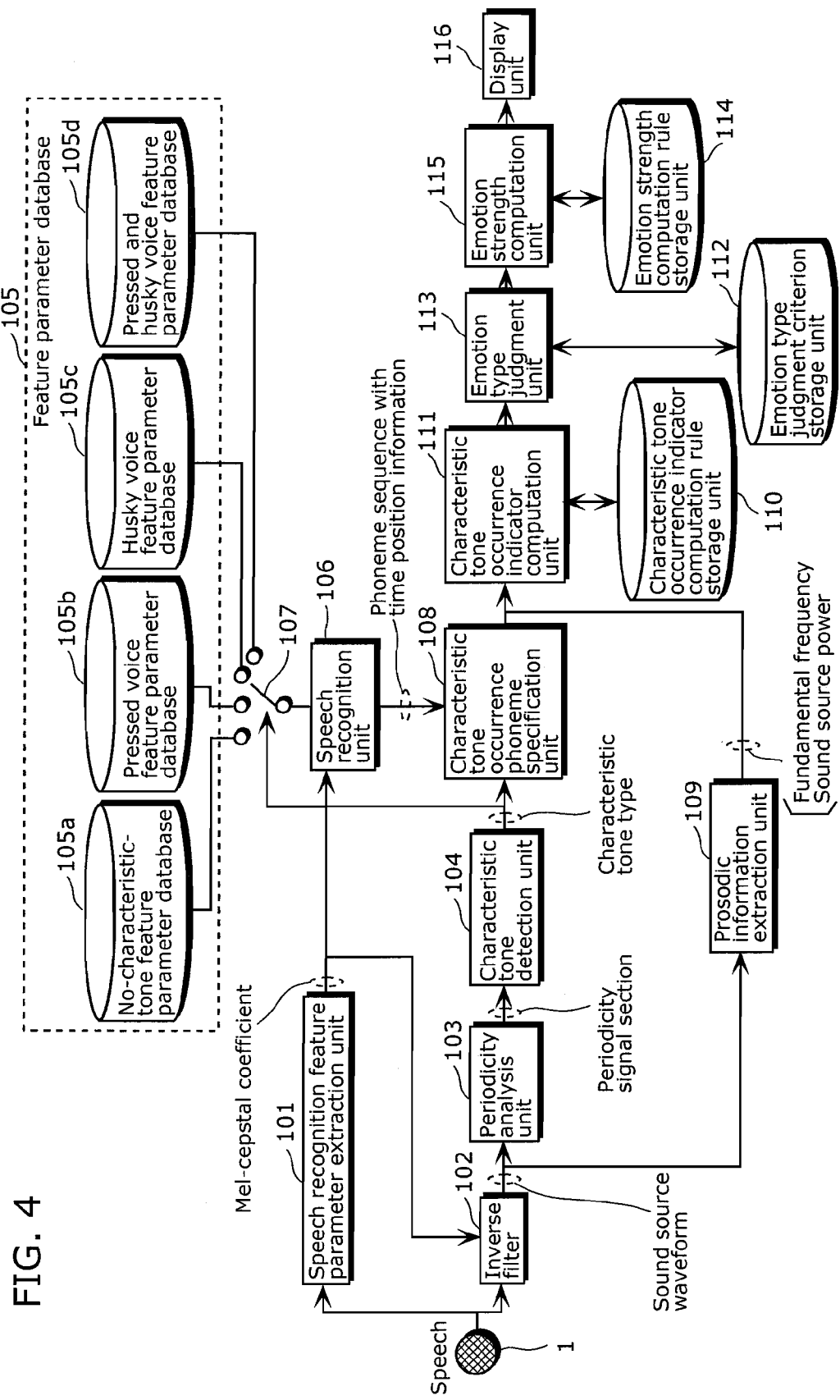
FIG. 4 is a block diagram showing a speech-based emotion recognition apparatus according to a first embodiment of the present invention.
Figure 5:
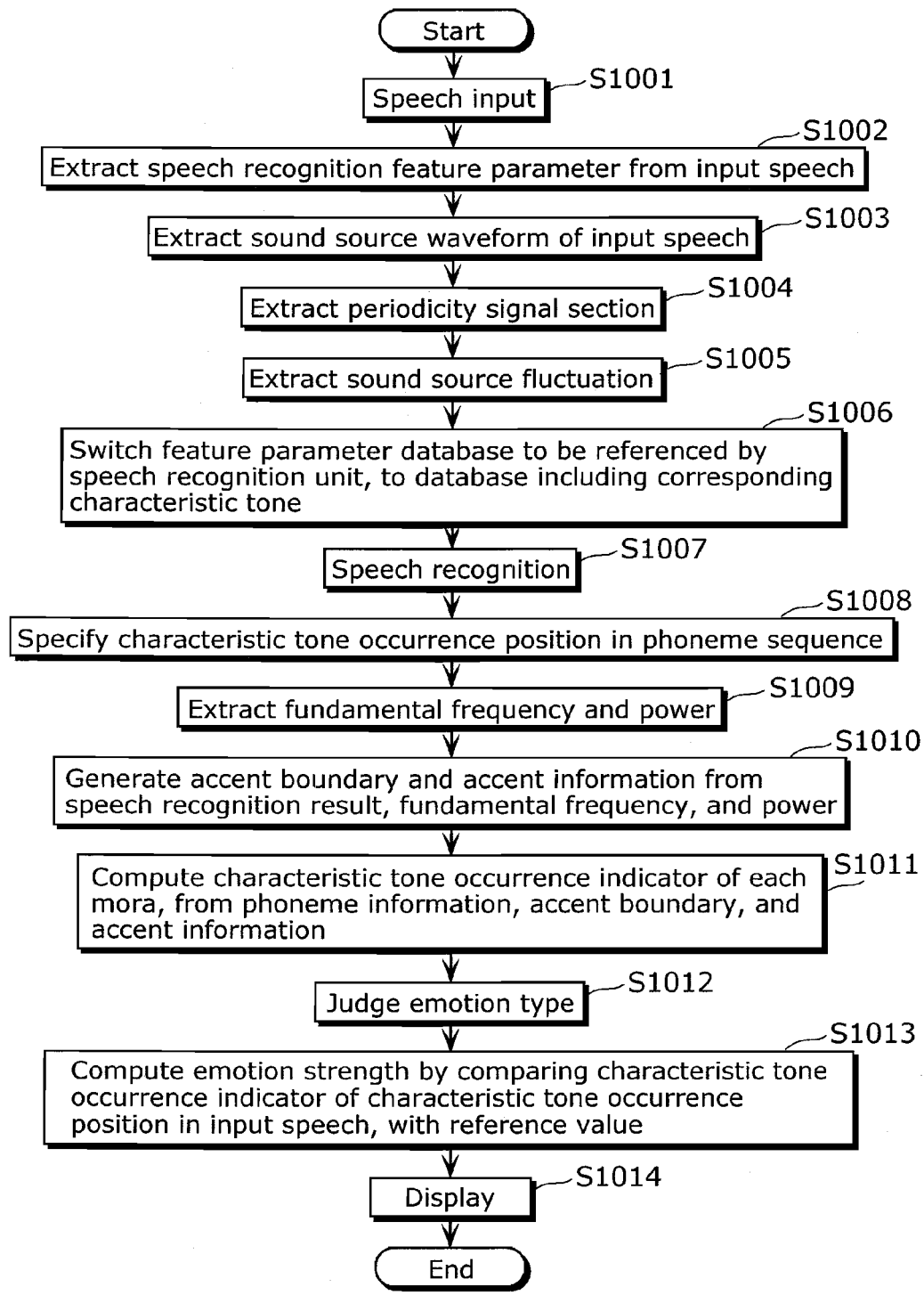
FIG. 5 is a flowchart showing an operation of the speech-based emotion recognition apparatus according to the first embodiment of the present invention.
Figure 6:
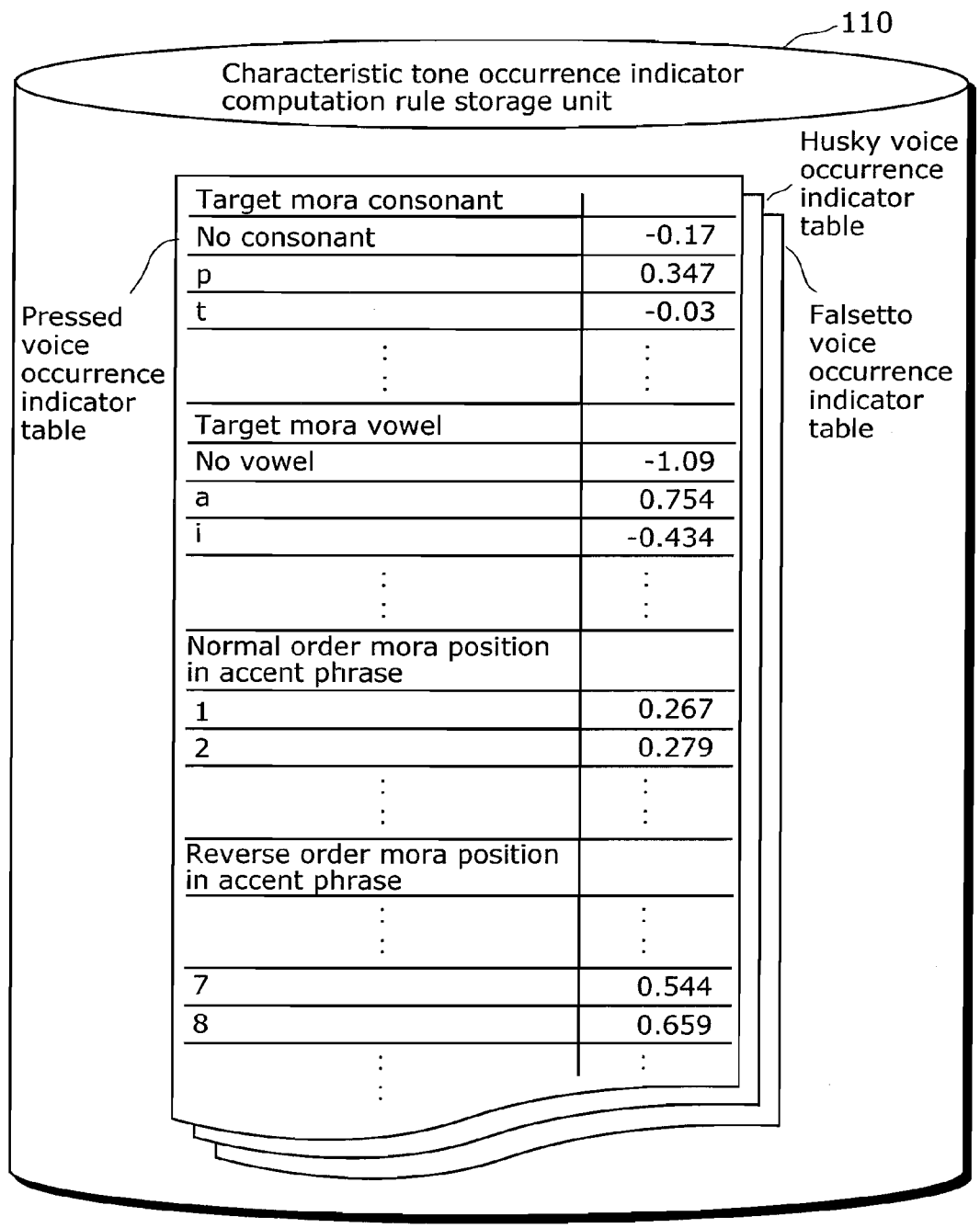
FIG. 6 shows one example of a computation rule for a characteristic tone occurrence indicator, according to the first embodiment of the present invention.
Figure 7:
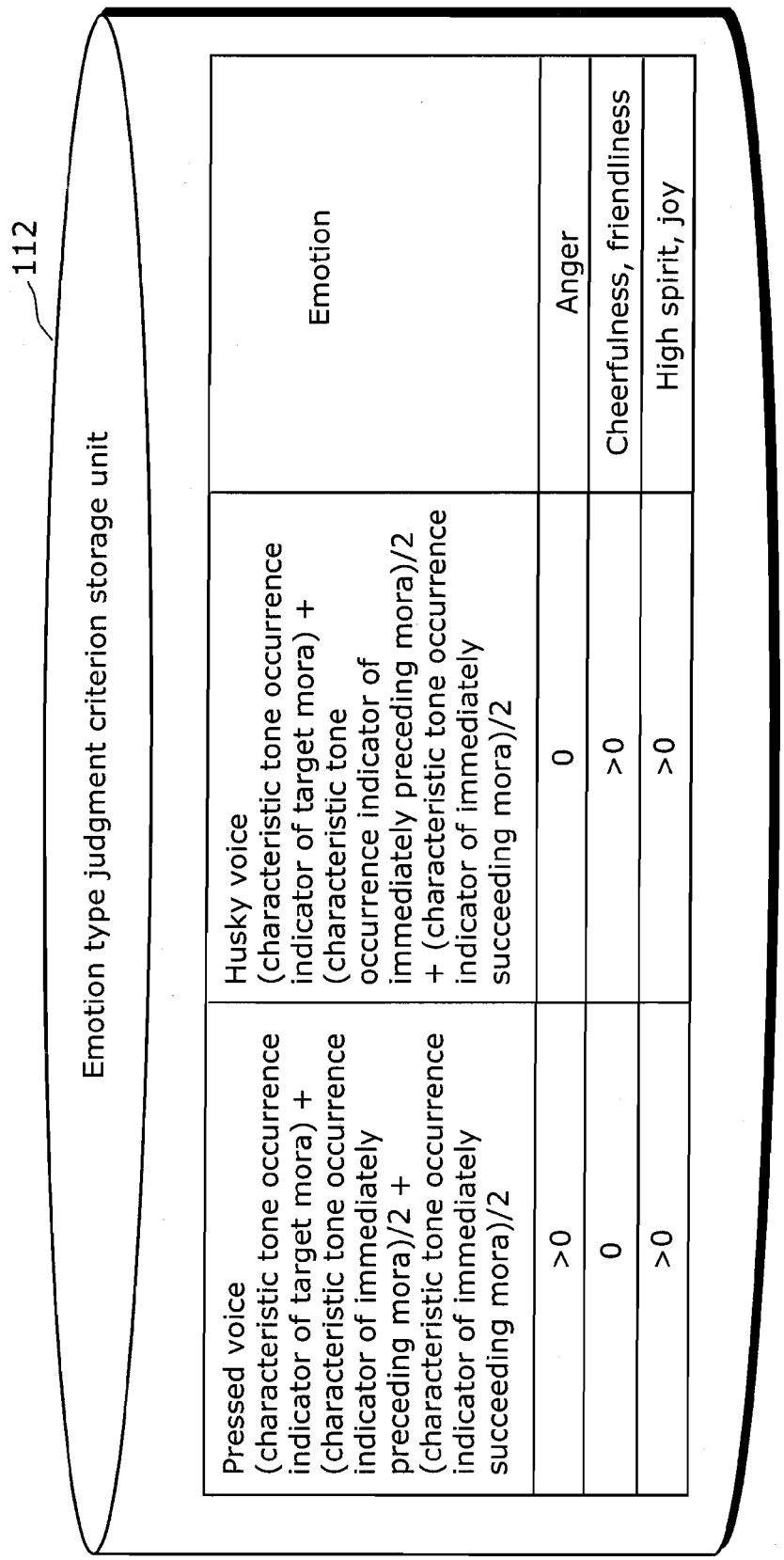
FIG. 7 shows one example of an emotion type judgment rule, according to the first embodiment of the present invention.

FIG. 4 is a functional block diagram showing a speech-based emotion recognition apparatus according to a first embodiment of the present invention. FIG. 5 is a flowchart showing an operation of the emotion recognition apparatus according to the first embodiment. FIG. 6 shows one example of a computation rule stored in a characteristic tone occurrence indicator computation rule storage unit 110. FIG. 7 shows one example of a judgment criterion stored in an emotion type judgment criterion storage unit 112. FIG. 8 shows one example of an emotion strength computation rule stored in an emotion strength computation rule storage unit 114.

In FIG. 4, the emotion recognition apparatus is an apparatus for recognizing an emotion based on a speech, and includes a microphone 1, a speech recognition feature parameter extraction unit 101, an inverse filter 102, a periodicity analysis unit 103, a characteristic tone detection unit 104, a feature parameter database 105, a speech recognition unit 106, a switch 107, a characteristic tone occurrence phoneme specification unit 108, a prosodic information extraction unit 109, the characteristic tone occurrence indicator computation rule storage unit 110, a characteristic tone occurrence indicator computation unit 111, the emotion type judgment criterion storage unit 112, an emotion type judgment unit 113, the emotion strength computation rule storage unit 114, an emotion strength computation unit 115, and a display unit 116.

The microphone 1 is a processing unit that converts an input speech to an electrical signal.

The speech recognition feature parameter extraction unit 101 is a processing unit that analyzes the input speech, and extracts a parameter indicating a spectral envelope, such as a mel-cepstral coefficient.

The inverse filter 102 is an inverse filter of spectral envelope information outputted from the speech recognition feature parameter extraction unit 101, and is a processing unit that outputs a sound source waveform of the speech inputted from the microphone 1.

The periodicity analysis unit 103 is a processing unit that analyzes periodicity of the sound source waveform outputted from the inverse filter 102, and extracts sound source information.

The characteristic tone detection unit 104 is a processing unit that detects a characteristic tone, such as a pressed voice, a falsetto voice, and a breathy (husky) voice, which appears in a speech depending on a speaker's emotion or speaking attitude, from the sound source information outputted from the periodicity analysis unit 103, by using a physical property such as an amplitude fluctuation in the sound source waveform or a periodicity fluctuation in the sound source waveform.

The feature parameter database 105 is a storage device that stores a feature parameter corresponding to each type of phoneme, for speech recognition. As one example, the feature parameter database 105 stores data which represents a distribution of a feature parameter of each phoneme, as a probabilistic model. The feature parameter database 105 is roughly made Lip of a feature parameter database generated using voice data without any characteristic tone, and a feature parameter database generated using voice data having a specific characteristic tone. For instance, the feature parameter database 105 includes a no-characteristic-tone feature parameter database 105a generated using voice data which has no characteristic tone, a pressed voice feature parameter database 105b generated using voice data which has a characteristic tone of a pressed voice, a husky voice feature parameter database 105c generated using voice data which has a characteristic tone of a breathy (husky) voice, and a pressed and husky voice feature parameter database 105d generated using voice data which has both a characteristic tone of a pressed voice and a characteristic tone of a breathy (husky) voice.

The speech recognition unit 106 is a processing unit that references the feature parameter database 105, and performs speech recognition by matching a feature parameter outputted from the speech recognition feature parameter extraction unit 101 with a feature parameter stored in the feature parameter database 105.

The switch 107 switches a database, in the feature parameter database 105, that is to be referenced by the speech recognition unit 106, in accordance with the presence or absence of a fluctuation in the sound source waveform detected by the characteristic tone detection unit 104 and a type of the fluctuation.

The characteristic tone occurrence phoneme specification unit 108 is a processing unit that specifies a phoneme at which the characteristic tone occurs in the input speech, using phoneme sequence information outputted from the speech recognition unit 106 and time position information of the characteristic tone in the input speech outputted from the characteristic tone detection unit 104.

The prosodic information extraction unit 109 is a processing unit that extracts a fundamental frequency and power of the speech, from the sound source waveform outputted from the inverse filter 102.

The characteristic tone occurrence indicator computation rule storage unit 110 is a storage device that stores a rule for computing, for each phoneme, an indicator of an occurrence likelihood of a characteristic tone, from an attribute of the phoneme (for example, a consonant type, a vowel type, a position in an accent phrase or a stress phrase, a relation with an accent or stress position, an absolute value or slope of the fundamental frequency, and the like).

The characteristic tone occurrence indicator computation unit 111 is a processing unit that computes a characteristic tone occurrence indicator for each phoneme in the input speech with reference to the characteristic tone occurrence indicator computation rule storage unit 110, by using the phoneme sequence information generated by the speech recognition unit 106 and the prosodic information, i.e., the fundamental frequency and the power, outputted from the prosodic information extraction unit 109.

The emotion type judgment criterion storage unit 112 is a storage device that stores a criterion for judging an emotion type based on a combination of a characteristic tone type and a characteristic tone occurrence indicator of each of a target mora and its adjacent mora.

The emotion type judgment unit 113 is a processing unit that judges an emotion type for each mora with reference to the criterion stored in the emotion type judgment criterion storage unit 112, based on characteristic tone occurrence position information generated by the characteristic tone occurrence phoneme specification unit 108.

The emotion strength computation rule storage unit 114 is a storage device that stores a rule for computing a degree of an emotion or speaking attitude, from the characteristic tone occurrence indicator and the characteristic tone occurrence position information of the input speech.

The emotion strength computation unit 115 is a processing unit that outputs a degree of an emotion or speaking attitude, an emotion type, and a phoneme sequence with reference to the emotion strength computation rule storage unit 114, using the information generated by the characteristic tone occurrence phoneme specification unit 108 and showing the phoneme at which the characteristic tone occurs in the input speech, and the characteristic tone occurrence indicator of each phoneme computed by the characteristic tone occurrence indicator computation unit 111.

The display unit 116 is a display device that displays the output of the emotion strength computation unit 115.

The operation of the speech-based emotion recognition apparatus having the above structure is described below, with reference to FIG. 5.

First, a speech is inputted via the microphone 1 (Step S1001). The speech recognition feature parameter extraction unit 101 analyzes the input speech, and extracts a mel-cepstral coefficient as an acoustic feature parameter for speech recognition (Step S1002). Next, the inverse filter 102 sets a parameter by inverse filtering the mel-cepstral coefficient generated in Step S1002, passes the speech signal inputted via the microphone in Step S1001, and extracts a sound source waveform (Step S1003).

The periodicity analysis unit 103 obtains periodicity of the sound source waveform extracted in Step S1003, in the following mariner. The periodicity analysis unit 103 computes, for example, fundamentalness from a size of an amplitude modulation and a size of a frequency modulation of a filter output that has a breaking characteristic which is gradual in low frequencies and sharp in high frequencies as described in Japanese Patent Application Publication No. H10-197575, and outputs a time region of a signal having periodicity in the input speech, as a periodicity signal section (Step S1004).

The characteristic tone detection unit 104 detects a fluctuation of the sound source waveform, in the periodicity signal section extracted by the periodicity analysis unit 103 in Step S1004. In this embodiment, the characteristic tone detection unit 104 detects a fundamental frequency fluctuation (jitter) of the sound source waveform and a high frequency component fluctuation of the sound source waveform, as the fluctuation of the sound source waveform (Step S1005). Note here that the fundamental frequency fluctuation can be detected by using, for example, an instantaneous frequency obtained according to a method described in Japanese Patent Application Publication No. H10-197575. Also, the high frequency component fluctuation of the sound source waveform can be detected by using a normalized amplitude index obtained by normalizing, by a fundamental frequency, an outcome of dividing a peak-to-peak amplitude of a sound source waveform by a minimum amplitude (a maximum negative peak) of differentiation of the sound source waveform, as with the technique described in Japanese Patent Application Publication No. 2004-279436.

The switch 107 is switched to connect the speech recognition unit 106 with an appropriate feature parameter database in the feature parameter database 105, according to whether or not the frequency fluctuation of the sound source waveform or the high frequency component fluctuation of the sound source waveform is detected in the periodicity signal section of the input speech (Step S1006). In detail, when the frequency fluctuation of the sound source waveform is detected in Step S1005, the switch 107 connects the speech recognition unit 106 with the pressed voice feature parameter database 105b in the feature parameter database 105. When the high frequency component fluctuation of the sound source waveform, that is, a breathy voice (husky voice) component, is detected in Step S1005, the switch 107 connects the speech recognition unit 106 with the husky voice feature parameter database 105c in the feature parameter database 105. When both the frequency fluctuation of the sound source waveform and the high frequency component fluctuation of the sound source waveform are detected in Step S1005, the switch 107 connects the speech recognition unit 106 with the pressed and husky voice feature parameter database 105d in the feature parameter database 105. When neither the frequency fluctuation of the sound source waveform nor the high frequency component fluctuation of the sound source waveform is detected in Step S1005, the switch 107 connects the speech recognition unit 106 with the no-characteristic-tone feature parameter database 105*a* in the feature parameter database 105.

The speech recognition unit 106 references the feature parameter database, in the feature parameter database 105, that is connected by the switch 107 in Step S1006, and performs speech recognition using the mel-cepstral coefficient extracted in Step S1002. The speech recognition unit 106 outputs a phoneme sequence together with time position information in the input speech, as a recognition result (Step S1007).

The characteristic tone occurrence phoneme specification unit 108 specifies a phoneme at which a characteristic tone occurs in the input speech, using the phoneme sequence information accompanied by the time position information outputted from the speech recognition unit 106, and time position information of the characteristic tone in the input speech outputted from the characteristic tone detection unit 104 (Step S1008).

Meanwhile, the prosodic information extraction unit 109 analyzes the sound source waveform outputted from the inverse filter 102, and extracts a fundamental frequency and sound source power (Step S1009).

The characteristic tone occurrence indicator computation unit 111 compares, based on the phoneme sequence accompanied by the time position information generated by the speech recognition unit 106 and the information about the fundamental frequency and the sound source power extracted by the prosodic information extraction unit 109, the rise and fall of a fundamental frequency pattern and a sound source power pattern with the phoneme sequence, and generates an accent boundary and accent information corresponding to the phoneme sequence (Step S1010).

The characteristic tone occurrence indicator computation unit 111 further computes a characteristic tone occurrence indicator for each mora in the phoneme sequence, according to a rule stored in the characteristic tone occurrence indicator computation rule storage unit 110 for computing a characteristic tone occurrence likelihood from a mora attribute such as a consonant, a vowel, a mora position in an accent phrase, and a relative position from an accent nucleus (Step S1011). As one example, the characteristic tone occurrence indicator computation rule can be created in the following way. Statistical learning is conducted by using, from voice data that contains a voice having a characteristic tone, mora attributes as explanatory variables and two values of whether or not the characteristic tone occurs as a dependent variable, according to quantization II which is one type of statistical method handling qualitative data. A model that can numerically represent an occurrence likelihood of the characteristic tone from the mora attribute is then generated to thereby obtain the computation rule.

Suppose the characteristic tone occurrence indicator computation rule storage unit 110 stores a statistical learning result such as the one shown in FIG. 6, for each type of characteristic tone. The characteristic tone occurrence indicator computation unit 111 applies a statistical model stored in the characteristic tone occurrence indicator computation rule storage unit 110 according to an attribute of each mora, and computes a characteristic tone occurrence indicator. When the input speech is "Atatamarimashita" shown in FIG. 3B, the characteristic tone occurrence indicator computation unit 111 computes a point corresponding to an attribute of the first mora "A", as follows. A consonant point is −0.17, since the mora has no consonant. A vowel point is 0.754, since the mora has the vowel "a". A normal order point is 0.267, since the mora is the first mora in normal order in the accent phrase "Atatamarimashita". A reverse order point is 0.659, since the mora is the eighth mora in reverse order in the accent phrase. The characteristic tone occurrence indicator computation unit 111 computes a characteristic tone occurrence indicator of the first mora "A", by adding these points together. The characteristic tone occurrence indicator computation unit 111 performs the same process for each mora, thereby computing a characteristic tone occurrence indicator of each mora. Thus, the characteristic tone occurrence indicator of each mora is computed according to its attribute, such that the characteristic tone occurrence indicator of the first mora "A" is 1.51 (=−0.17+0.754+0.267+0.659), the characteristic tone occurrence indicator of the second mora "ta" is 0.79, and the characteristic tone occurrence indicator of the third mora "ta" is 0.908.

The emotion type judgment unit 113 specifies a characteristic tone occurrence type in the input speech, from a characteristic tone occurrence position generated by the characteristic tone occurrence phoneme specification unit 108 and shown in units of phonemes. The emotion type judgment unit 113 references information in the emotion type judgment criterion storage unit 112 such as the one shown in FIG. 7, and specifies an emotion type in a mora at which the characteristic tone occurs in the input speech (Step S1012). Suppose "Atatamarima" in the input speech "Atatamarimashita" is spoken with a pressed voice whilst the other part is spoken with no characteristic tone. In this case, the emotion type judgment unit 113 judges an emotion only for the morae spoken with the characteristic tone with reference to the table of FIG. 7, and recognizes a change in emotion in units of morae. Consider the case of performing the computation according to FIG. 7, on "A" in FIG. 3B. Because there is no immediately preceding mora of the target mora "A", 0.395 which is half the pressed voice occurrence indicator 0.79 of its immediately succeeding mora is added to the pressed voice occurrence indicator 1.51 of the target mora, which yields 1.905. Meanwhile, there is no occurrence of a husky voice in the adjacent mora. Since the value computed for a pressed voice is positive whereas the value computed for a husky voice is 0, an emotion accompanying the target mora is judged as anger. Likewise, in the case of the second mora "ta", 0.755 which is half the pressed voice occurrence indicator 1.51 of its immediately preceding mora and 0.455 which is half the pressed voice occurrence indicator 0.91 of its immediately succeeding mora are added to the pressed voice occurrence indicator 0.79 of the target mora, which yields 2.0. Hence an emotion accompanying the second mora is judged as anger, as with the first mora.

However, in the case of the input speech "Juppun hodo kakarimasu" shown in FIG. 3A, "ho" is spoken with a husky voice. Though no characteristic tone occurs in its immediately preceding mora, its immediately succeeding mora "do" is spoken with a pressed voice. Accordingly, the target mora "ho" is judged by using both the husky voice occurrence indicator 2.26 of the target mora and 0.365 which is half the pressed voice occurrence indicator 0.73 of its immediately succeeding mora. Based on the table of FIG. 7, "ho" and similarly "do" are judged as containing an emotion of high spirit/joy. On the other hand, only the characteristic tone of a pressed voice is detected in "kaka" which follows "hodo". Accordingly, this part is judged as containing an emotion of anger, based on the table of FIG. 7. Thus, the user's emotion which varies as he or she speaks to the system can be followed in units of morae.

Regarding the input speech "Atatamarimashita", suppose an emotion strength computation rule in the emotion strength computation rule storage unit 114 such as the one shown in FIG. 8 is referenced for the characteristic tone occurrence indicator of each mora computed in Step S1011 (for example, 1.51 for the first mora "A", 0.79 for the second mora "ta", and 0.908 for the third mora "ta"). The pressed voice occurrence indicator of the first mora "A" is 1.51 which is no smaller than 0.9, so that a pressed voice likelihood is judged as high. When "Atatamarima" in the input speech "Atatamarimashita" is spoken with a pressed voice as shown in FIG. 3B, a pressed voice occurs in the first mora "A" that has a high pressed voice likelihood, and so a strength of anger is low. The pressed voice occurrence indicator of the second mora "ta" is 0.79 which corresponds to a medium pressed voice likelihood, and so a strength of anger is medium. The pressed voice occurrence indicator of the third mora "ta" is 0.908 which corresponds to a high pressed voice likelihood, and so a strength of anger is low. Thus, the emotion strength is computed for each mora (Step S1013). This allows a change in emotion strength to be detected in more detail than in the emotion judgment in Step S1012. The display unit 116 displays the emotion strength of each mora computed and outputted by the emotion strength computation unit 115 in Step S1013 (Step S1014).

Regarding the input "Juppun hodo kakarimasu" shown in FIG. 3A, "ho" is judged as containing high spirit/joy in Step S1012, based on the husky voice occurrence indicator 2.26 and the pressed voice occurrence indicator 0.365. With reference to the rule in the emotion strength computation rule storage unit 114 shown in FIG. 8, multiplying the pressed voice occurrence indicator and the husky voice occurrence indicator of "ho" yields 0.8249, so that a strength of high spirit/joy is low. Regarding "do", the pressed voice occurrence indicator 0.73 of the target mora and half the pressed voice occurrence indicator 1.57 of its immediately succeeding mora are added together to yield 1.515. Meanwhile, half the husky voice occurrence indicator 2.26 of its immediately preceding mora "ho" is 1.13. Multiplying these two values yields 1.171195, so that a strength of high spirit/joy is low. Regarding the next mora "ka", the pressed voice occurrence indicator of the target mora, half the pressed voice occurrence indicator of its immediately preceding mora, and half the pressed voice occurrence indicator of its immediately succeeding mora are added together to yield 2.55, so that a strength of anger is low.

The following describes a method of creating the relationship between the indicator range, the pressed voice likelihood, and the emotion strength, in a method of creating the emotion strength computation rule stored in the emotion strength computation rule storage unit 114 shown in FIG. 8. FIG. 9 represents a relationship between an occurrence frequency of a mora with a pressed voice, an occurrence frequency of a mora without a pressed voice, and an indicator of a pressed voice likelihood, and a relationship between an emotion strength (weakness) and the indicator. In FIG. 9, the horizontal axis shows the indicator of the pressed voice likelihood computed for each mora, where the pressed voice likelihood increases in a rightward direction. The vertical axis shows the occurrence frequencies of a mora with a pressed voice and a mora without a pressed voice in a speech, as well as a pressed voice probability of each mora. Here, the left axis of the graph shows the occurrence frequencies of a mora with a pressed voice and a mora without a pressed voice, whereas the right axis of the graph shows the pressed voice probability of each mora. Of the curves shown in the graph, the solid line is a function showing a relationship between the indicator and the occurrence frequency of a mora with a pressed voice, which is generated from actual speech data. The dotted line is a function showing a relationship between the indicator and the occurrence frequency of a mora without a pressed voice, which is generated from the actual speech data. The dashed line indicates emotion weakness which is obtained, from both functions, by finding an occurrence frequency of a pressed voice in a mora having a certain indicator value and expressing the frequency in percentage as a pressed voice occurrence probability. The occurrence probability, that is, the emotion weakness, has a property that the emotion is stronger when the occurrence indicator is smaller, and weaker when the occurrence indicator is larger. For the emotion weakness function which varies with the occurrence indicator as shown in FIG. 9, an emotion strength range is set using actual speech data, and an occurrence indicator corresponding to a boundary of the emotion strength range is specified according to the function, as a result of which the table shown in FIG. 8 can be obtained.

Though the emotion strength is computed using the table generated from the emotion weakness function in the emotion strength computation rule storage unit 114 shown in FIG. 8, the function shown in FIG. 9 may be stored so that the emotion weakness, i.e., the function strength, is computed directly based on the function.

According to the above structure, a sound source fluctuation is extracted from an input speech as a characteristic tone which reflects an emotion. A feature parameter database including the characteristic tone and a feature parameter database not including the characteristic tone are stored and switched depending on the presence or absence of the sound source fluctuation. This enables an improvement in speech recognition accuracy. Meanwhile, a characteristic tone occurrence likelihood, which is computed based on a speech recognition result, is compared with the presence or absence of the sound source fluctuation in the actual input speech. When the characteristic tone occurs in a part of the input speech where the characteristic tone is likely to occur, the emotion strength is judged as low. When the characteristic tone occurs in a part of the input speech where the characteristic tone is unlikely to occur, the emotion strength is judged as high. In this way, the speaker's emotion type and strength can be accurately recognized from the input speech, without being affected by language, individual, and regional differences.

Speech recognition accuracy for a characteristic tone which is found in a speech having an emotional expression is low in the case where a feature parameter database generated from expressionless voice data is used. However, by switching to a feature parameter database generated from a voice having the characteristic tone, this speech recognition accuracy can be improved. The improvement in recognition accuracy leads to an improvement in computation accuracy of a characteristic tone occurrence likelihood which is computed using a phoneme sequence. This in turn contributes to an improvement in computation accuracy of an emotion strength. Furthermore, by detecting the characteristic tone in units of morae and performing emotion recognition in units of morae, a change in emotion in the input speech can be followed on a mora basis. In the case where the system is applied to interactive control and the like, this is effective when specifying how the user, i.e., the speaker, reacts to an event in an interactive operation process, as well as which event the user reacts to. Since a change in the user's emotion can be perceived in detail from his or her input speech, the system can output, for example, a polite apology such as "I deeply apologizes . . . " or a polite request such as "I am sorry to trouble you, but . . . ", depending on the anger strength of the user. This brings the user's emotion to a normal state, with it being possible to realize a smooth operation as an interactive interface.

Variation of the First Embodiment

Figure 10:
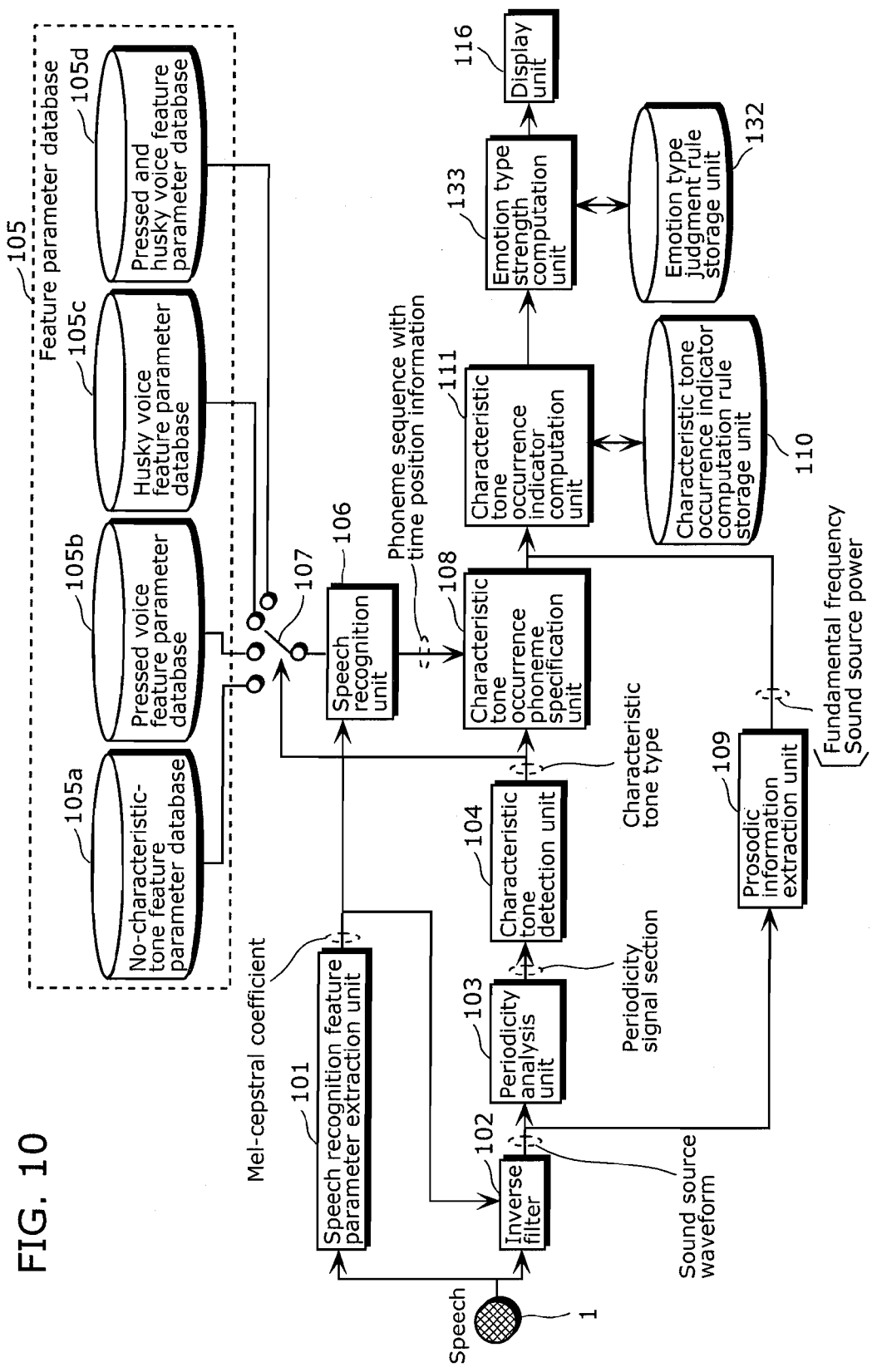
FIG. 10 is a block diagram showing a speech-based emotion recognition apparatus according to a variation of the first embodiment of the present invention.
Figure 11:
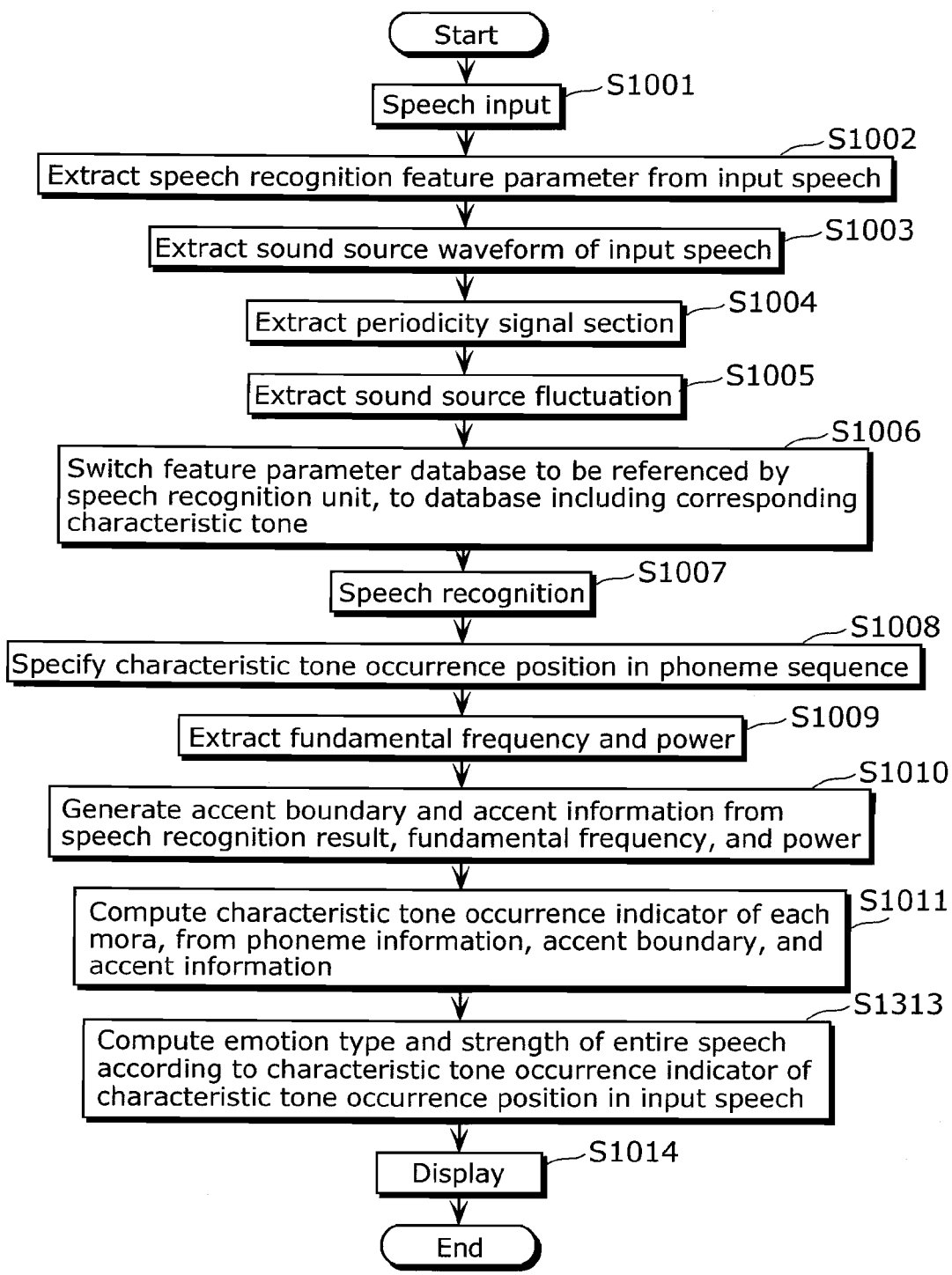
FIG. 11 is a flowchart showing an operation of the speech-based emotion recognition apparatus according to the variation of the first embodiment of the present invention.

A variation of the first embodiment of the present invention is described below. FIG. 10 is a functional block diagram showing a variation of the speech-based emotion recognition apparatus according to the first embodiment of the present invention. FIG. 11 is a flowchart showing an operation of the speech-based emotion recognition apparatus according to the variation of the first embodiment. FIG. 12 shows a phoneme sequence of an input speech, a mora spoken with a characteristic tone, a pressed voice occurrence indicator of the mora, and a husky voice occurrence indicator of the mora. FIG. 13 shows an example criterion for judging an emotion type, which is stored in an emotion type judgment rule storage unit 132.

The emotion recognition apparatus shown in FIG. 10 has a similar structure to the emotion recognition apparatus according to the first embodiment shown in FIG. 4, but partly differs in structure.

In detail, the emotion type judgment criterion storage unit 112 in FIG. 4 has been replaced with the emotion type judgment rule storage unit 132. Also, the emotion type judgment unit 113 and the emotion strength computation unit 115 have been replaced with an emotion type strength computation unit 133. Further, the emotion strength computation rule storage unit 114 has been omitted, and the emotion type strength computation unit 133 references the emotion type judgment rule storage unit 132. The speech-based emotion recognition apparatus having the above structure computes the characteristic tone occurrence indicator of each mora, in Step S1011 in the first embodiment. In an example shown in FIG. 12, if the characteristic tones of a pressed voice and a husky voice are extracted and an emotion is judged based only on occurrence frequencies of these characteristic tones, the characteristic tone of a pressed voice which has a larger number of morae influences more on the judgment. As a result, the speech is judged as containing anger where a pressed voice typically appears, and the system responds with an apology. However, the input speech is actually accompanied by a medium degree of high spirit/joy. In such a case, the interactive system needs to provide information so that the user can enjoy communicating with the system more.

In FIG. 12, for example, a pressed voice occurs in 5 morae out of 24 morae whilst a husky voice occurs in 3 morae out of the 24 morae. This being the case, a pressed voice characteristic tone occurrence indicator and a husky voice characteristic tone occurrence indicator are computed for each mora, in the same manner as in Step S1011. A sum of inverses of pressed voice characteristic tone occurrence indicators is 4.36. On the other hand, a sum of inverses of husky voice characteristic tone occurrence indicators is 4.46. This indicates that, though a pressed voice occurs in more morae, a husky voice occurs even where a husky voice is unlikely to occur, and therefore an emotion that causes a husky voice is stronger. The emotion type strength computation unit 133 judges an emotion type and strength, according to an emotion type judgment rule such as the one shown in FIG. 13 (Step S1313).

Alternatively, an average of indicators of one type of characteristic tone may be used. For instance, in FIG. 3B, 6 out of 8 morae are spoken with a pressed voice, while there is no other characteristic tone. When computing in the same way as when both of the characteristic tones of a pressed voice and a husky voice occur, a sum of inverses (0.52 for the first mora "A", 0.50 for the second mora "ta", 0.56 for the third mora "ta", 1.04 for the fourth mora "ma", 6.45 for the fifth mora "ri", and 1.53 for the sixth mora "ma") of pressed voice characteristic tone occurrence indicators is 10.6. With reference to the emotion strength computation rule shown in FIG. 13, it can be understood that the emotion type is anger and the emotion strength is weak. In the first embodiment, the fifth mora "ri" has the characteristic tone occurrence indicator −0.85 in FIG. 3B, and accordingly the emotion type is judged as anger and the emotion strength is judged as strong with reference to FIG. 8. Thus, the judgment result of the emotion strength is different from when the judgment is performed for each mora as in the first embodiment. This variation where the interactive system judges the emotion type and strength for the entire input speech is effective in the case where a human-system interaction is short and simple. In the case of a complex and long conversation, it is important to judge the emotion type and strength for each mora and detect a change in emotion type and strength, as in the first embodiment. In the case of using the interactive system for a very simple conversation, however, the method of judging the emotion type and strength for the entire input speech can be effectively used. Take an interactive system for selling tickets as one example. Suppose the interactive system asks "Nanmai desuka?" ("How many tickets do you need?") and the user responds "Nimai onegai shimasu" ("Two tickets, please"). In this case, the emotion type and strength are judged for the entire input speech "Nimai onegai shimasu". If the system cannot recognize the speech, the system apologizes according to the emotion type and strength, and requests the response from the user again. In this way, the interactive system can operate effectively. Therefore, a speech recognition system according to this variation, which judges an emotion type and strength for an entire input speech using an indicator of only one type of characteristic tone, is useful as an interactive system that conducts a short or simple conversation, and the like.

Note here that the value used for emotion judgment may be computed using, for each type of characteristic tone of each mora, a sum of an inverse of an indicator of each mora. Alternatively, the value used for emotion judgment may be computed by, for each type of characteristic tone, averaging characteristic tone occurrence indicators at characteristic tone occurrence positions in the input speech, obtaining a number of morae where the characteristic tone occurs relative to a total number of morae in the input speech as a characteristic tone frequency, and multiplying the above characteristic tone occurrence indicator average by an inverse of the characteristic tone frequency. As another alternative, the value used for emotion judgment may be computed by, for each type of characteristic tone, averaging characteristic tone occurrence indicators at characteristic tone occurrence positions in the input speech and multiplying an inverse of the average by the characteristic tone frequency. The value used for emotion judgment may also be computed according to any other method, so long as a characteristic tone occurrence likelihood is reflected in emotion judgment as a weight and a judgment criterion corresponding to the computation method is stored in the emotion type judgment rule storage unit 132.

This variation describes the case where the characteristic tone occurrence indicator strength is computed in Step S1313 and the emotion type judgment rule storage unit 132 stores the judgment rule which utilizes a difference in strength of each characteristic tone. Alternatively, the judgment rule may be formed by a ratio of characteristic tone occurrence indicator strengths.

According to the above structure, a sound source fluctuation is extracted from an input speech as a characteristic tone that reflects an emotion. By switching a feature parameter database depending on the presence or absence of the sound source fluctuation, speech recognition is conducted with improved accuracy. A characteristic tone occurrence likelihood is computed using a result of this speech recognition. When the characteristic tone occurs in a part of the input speech where the characteristic tone is likely to occur, the emotion strength is judged as low. When the characteristic tone occurs in a part of the input speech where the characteristic tone is unlikely to occur, the emotion strength is judged as high. Thus, through the use of an occurrence indicator of a characteristic tone detected in one input speech, the speaker's emotion type and strength represented by the entire input speech can be recognized accurately, without being affected by individual and regional differences.

Second Embodiment

In emotion recognition that uses a characteristic tone in a speech in the present invention, highly accurate emotion recognition can be performed by computing a characteristic tone occurrence indicator using a phoneme sequence obtained as a result of speech recognition. In speech recognition, however, a characteristic tone accompanied by an emotion often deviates from a normal acoustic model. This causes a drop in speech recognition accuracy. In the first embodiment, this problem is solved by providing an acoustic model that includes a characteristic tone and switching to such an acoustic model. However, the provision of a plurality of types of acoustic model requires an increase in data amount, as well as an increase in offline operation for generating such acoustic models. To overcome this problem of the first embodiment, a second embodiment of the present invention relates to a structure of modifying a recognition result of an acoustic model by using a language model to improve speech recognition accuracy, and computing a characteristic tone occurrence indicator based on a phoneme sequence of a correct speech recognition result to thereby perform emotion recognition with high accuracy.

Figure 14:
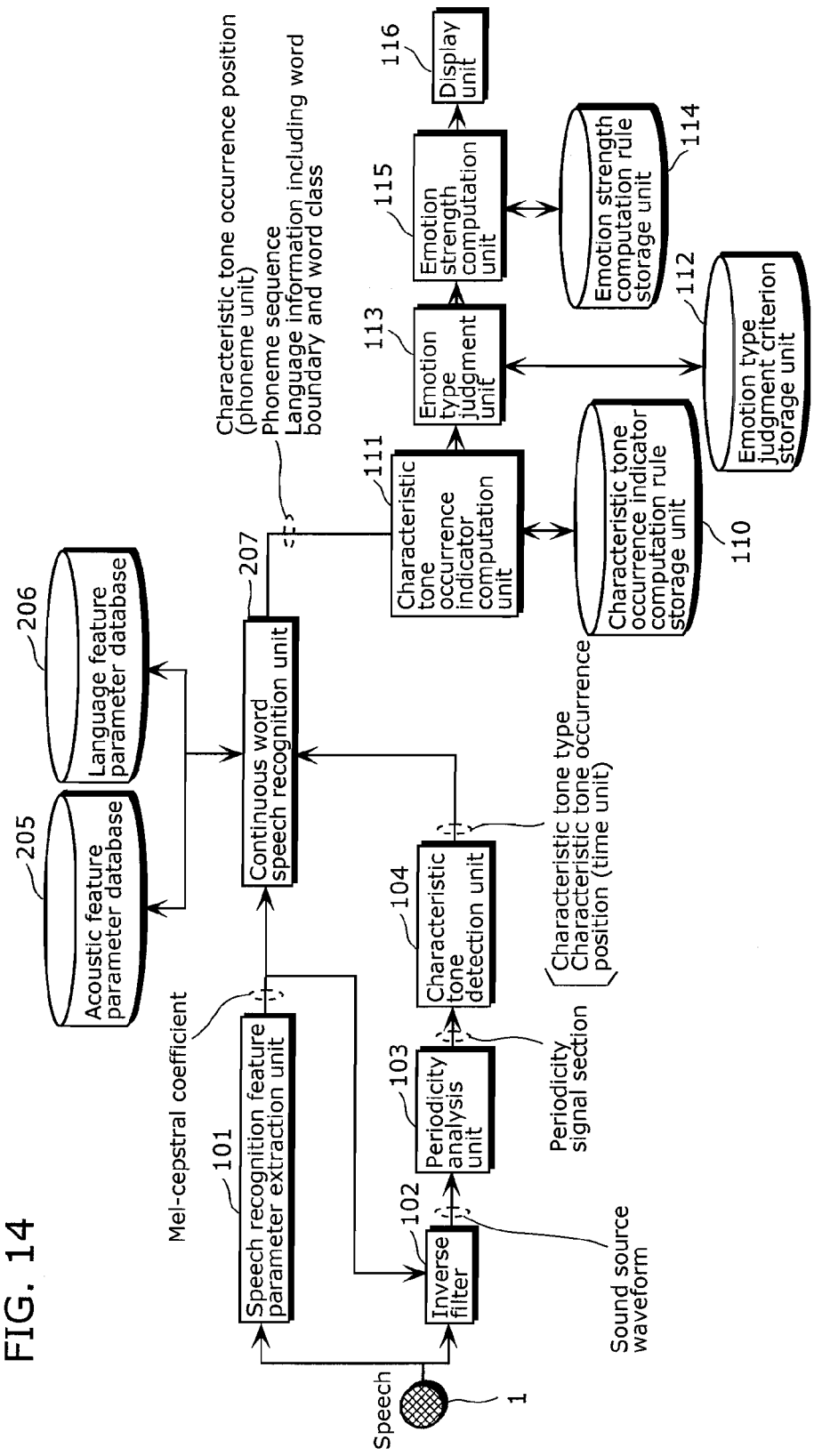
FIG. 14 is a block diagram showing a speech-based emotion recognition apparatus according to a second embodiment of the present invention.
Figure 15:
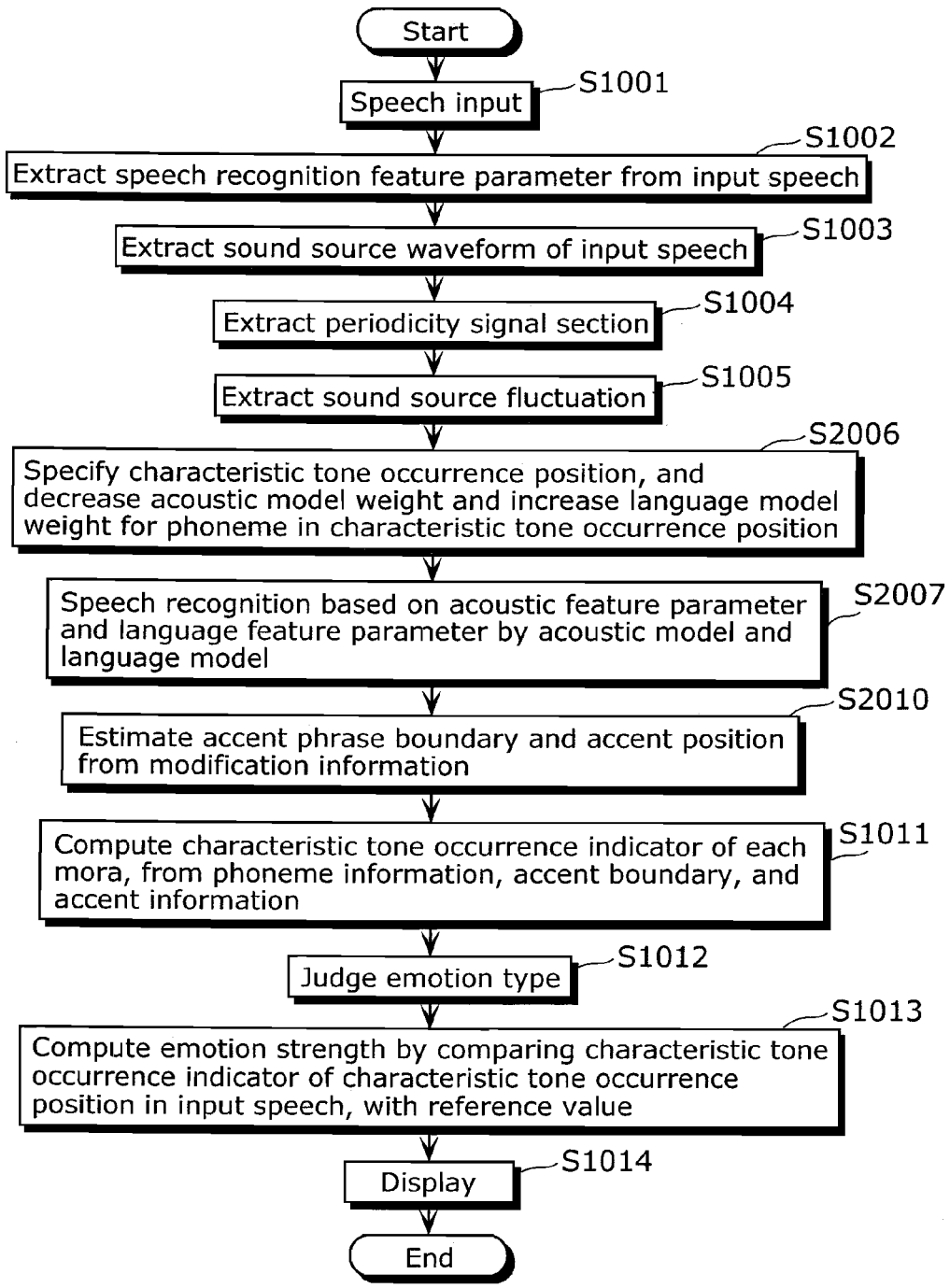
FIG. 15 is a flowchart showing an operation of the speech-based emotion recognition apparatus according to the second embodiment of the present invention.

FIG. 14 is a functional block diagram showing a speech-based emotion recognition apparatus according to the second embodiment of the present invention. FIG. 15 is a flowchart showing an operation of the speech-based emotion recognition apparatus according to the second embodiment. FIGS. 16A to 16C show a specific example of the operation according to the second embodiment.

In FIG. 14, only the parts that are different from FIG. 4 are described below, while omitting an explanation of the same parts as FIG. 4. In FIG. 15 too, only the parts that are different from FIG. 5 are described below, while omitting an explanation of the same parts as FIG. 5.

In FIG. 14, the emotion recognition apparatus has a similar structure to the one shown in FIG. 4, except that the prosodic information extraction unit 109 and the switch 107 in the functional block diagram of FIG. 4 have been omitted, the feature parameter database 105 has been replaced with an acoustic feature parameter database 205, a language feature parameter database 206 has been added, and the speech recognition unit 106 has been replaced with a continuous word speech recognition unit 207 that performs recognition including not only phonemes but also language information, by using an acoustic feature parameter and a language feature parameter based on the language model.

The operation of the speech-based emotion recognition apparatus having the above structure is described below, with reference to FIG. 15. The following description focuses only on the different parts from FIG. 5, while omitting the same parts as FIG. 5.

A speech is inputted via the microphone 1 (Step S1001), and the speech recognition feature parameter extraction unit 101 extracts a mel-cepstral coefficient (Step S1002). The inverse filter 102 extracts a sound source waveform (Step S1003), and the periodicity analysis unit 103 outputs a time region of a signal having periodicity in the input speech, as a periodicity signal section (Step S1004). The characteristic tone detection unit 104 detects a fluctuation of the sound source waveform, such as a fundamental frequency fluctuation (jitter) of the sound source waveform and a high frequency component fluctuation of the sound source waveform, in the periodicity signal section (Step S1005). The continuous word speech recognition unit 207 references the acoustic feature parameter database 205 storing the acoustic model and the language feature parameter database 206 storing the language model, and performs speech recognition using the mel-cepstral coefficient extracted in Step S1002. For example, the speech recognition by the continuous word speech recognition unit 207 is based on a speech recognition method that employs a probabilistic model using an acoustic model and a language model.

$$\hat{W} = \underset{w}{\mathrm{argmax}} P(Y/W) P(W). \qquad \text{[Expression 1]}$$

Here, W denotes a designated word series, Y denotes an acoustic observed value series, P(Y/W) denotes a probability of the acoustic observed value series conditioned by the word series (acoustic model), and P(W) denotes a probability for an assumed word series (language model). As shown by Expression 1, typical recognition is performed by selecting a word series having a highest product of the acoustic model and the language model. A logarithm of Expression 1 can be written as follows.

$$\hat{W} = \underset{w}{\mathrm{argmax}} \log P(Y/W) + \log P(W). \qquad \text{[Expression 2]}$$

Since the acoustic model and the language model may not necessarily have a perfect balance, it is necessary to assign weights to both models. Typically, a weight of the language model is set as a ratio between the weights of both models, as follows.

$$\hat{W} = \underset{w}{\mathrm{argmax}} \log P(Y/W) + \alpha \log P(W). \qquad \text{[Expression 3]}$$

Here, α denotes the weight of the language model, in both of the acoustic model and the language model. In ordinary recognition processing, language model weight α has a temporally fixed value. However, the continuous word speech recognition unit 207 acquires information about an occurrence position of a characteristic tone detected in Step S1005, and performs continuous speech recognition based on a model that changes language model weight a in units of words. This model is expressed as follows.

$$\hat{W} = \underset{w}{\mathrm{argmax}} \log P(Y/W) + \sum_{i=1}^{n} \alpha_i \log P(w_i \mid w_1 \wedge w_{i-1}). \qquad \text{[Expression 4]}$$

Here, $w_i$ denotes an i-th word, and $\alpha_i$ denotes a language model weight applied to the i-th word. In the speech recognition operation based on the acoustic feature parameter database and the language feature parameter database, when a frame subjected to the speech recognition contains a characteristic tone, the continuous word speech recognition unit 207 increases language model weight α to relatively decrease the acoustic model weight (Step S2006), and performs the speech recognition (Step S2007). By increasing the language model weight and decreasing the acoustic model weight, a decrease in recognition accuracy caused by a mismatch of the acoustic model in the characteristic tone occurrence position can be suppressed. The continuous word speech recognition unit 207 estimates an accent phrase boundary and an accent position from word reading information, accent information, and word class information, for a word sequence and phoneme sequence obtained as a result of the speech recognition of the input speech (Step S2010).

Suppose a speech having a phoneme sequence "Namae wo kaku enpitsu ga hoshii n desu" ("I want a pencil to write names") is inputted with "enpitsu ga" being spoken with the characteristic tone of a pressed voice, as shown in FIG. 16A. The continuous word speech recognition unit 207 acquires information of the occurrence position of the characteristic tone detected in Step S1005. The continuous word speech recognition unit 207 applies language model weight α=0.9, which is determined according to learning data including no characteristic tone, to "Namae wo kaku" and "hoshii n desu" where no characteristic tone occurs. In a conventional continuous speech recognition method, language model weight α is fixed, so that language model weight α=0.9 to be applied when no characteristic tone occurs, is also applied to the part spoken with the characteristic tone, as shown in FIG. 16B. Consider the case where the part "enpitsu ga" spoken with a pressed voice matches well with "entotsu" ("chimney") according to the acoustic model that includes no pressed voice.

$$P(\text{entotsu}|\ldots\text{kaku}) < P(\text{enpitsu}|\ldots\text{kaku}) \quad \text{[Expression 5]}.$$

As shown by Expression 5, according to the language model, there is a higher probability of "enpitsu" following the word sequence from the sentence beginning before "kaku", rather than "entotsu", so that the following applies.

$$P(W_1) < P(W_2) \quad \text{[Expression 6]}.$$

$W_1$=Namae wo kaku entotsu ga hoshii n desu $W_2$=Namae wo kaku enpitsu ga hoshii n desu However, because the language model weight is small, the acoustic model weight is relatively large. This causes Expression 3 to be computed as follows.

$$\log P(Y/W_1) + 0.9 \times \log P(W_1) > \log P(Y/W_2) + 0.9 \times \log P(W_2) \quad \text{[Expression 7]}.$$

As a result, "Namae wo kaku entotsu ga hoshii n desu" will end up being adopted as a recognition result.

According to this embodiment, however, the continuous word speech recognition unit 207 increases the language model weight for "enpitsu ga" spoken with a pressed voice in step S2006, in order to prevent a drop in recognition accuracy that occurs when an input speech including a characteristic tone is recognized based on an acoustic model generated from learning data which does not include the characteristic tone. In detail, as shown in FIG. 16C, language model weight α=2.3, which is determined from data including a pressed voice, is applied. This results in the following.

$$\log P(Y/W_1) + \sum_{i=1}^{n} \alpha_i \log P(w_{1,i} \mid w_{1,1} \wedge w_{1,i-1}) < \quad \text{[Expression 8]}$$

$$\log P(Y/W_2) + \sum_{i=1}^{n} \alpha_i \log P(w_{2,i} \mid w_{2,1} \wedge w_{2,i-1}).$$

Accordingly, "Namae wo kaku enpitsu ga hoshii n desu" is adopted as a recognition result. Hence a correct recognition result can be obtained.

The characteristic tone occurrence indicator computation unit 111 acquires information about a phoneme sequence and a characteristic tone occurrence position shown in units of phonemes, and an accent phrase boundary and an accent position of the phoneme sequence, outputted from the continuous word speech recognition unit 207. The characteristic tone occurrence indicator computation unit 111 computes a characteristic tone occurrence indicator for each mora in the phoneme sequence, by using the acquired information and the rule, stored in the characteristic tone occurrence indicator computation rule storage unit 110, for computing a characteristic tone occurrence likelihood from a mora attribute such as a consonant, a vowel, a position in an accent phrase, and a relative position from an accent nucleus (Step S1011). The emotion type judgment unit 113 specifies a characteristic tone occurrence type in the input speech, from the characteristic tone occurrence position generated by the continuous word speech recognition unit 207 and shown in units of phonemes. The emotion type judgment unit 113 references the information in the emotion type judgment criterion storage unit 112, and specifies an emotion type corresponding to the type of the characteristic tone included in the input speech (Step S1012). The emotion strength computation unit 115 checks the characteristic tone occurrence position in the input speech shown in units of phonemes and the characteristic tone occurrence indicator computed for each mora by the characteristic tone occurrence indicator computation unit 111 in Step S1011. Based on the relationship between the indicator of each mora and the state of the mora in the input speech, the emotion strength computation unit 115 computes an emotion strength of each mora according to the rule stored in the emotion strength computation rule storage unit 114 (Step S1013). The display unit 116 displays the emotion strength of each mora computed and outputted by the emotion strength computation unit 115 in Step S1013 (Step S1014).

The second embodiment describes the case where the language model weight applied to a frame not including a characteristic tone is 0.9 and the language model weight applied to a frame spoken with a pressed voice is 2.3. However, other values may instead be used, as long as the language model weight is relatively large for the frame including the characteristic tone. Also, a language model weight may also be set for a characteristic tone other than a pressed voice, such as a husky voice and a falsetto voice. Two language model weights, namely, a language model weight applied to a frame including a characteristic tone and a language model weight applied to a frame not including the characteristic tone may be set for each of the other characteristic tone.

The variation of the first embodiment is equally applicable to the second embodiment.

According to the above structure, a sound source fluctuation is extracted from an input speech as a characteristic tone that reflects an emotion. When the sound source fluctuation exists, language model weighting coefficient α is increased to relatively decrease the acoustic model weight, considering that the acoustic model in the acoustic feature parameter database does not match very well. By doing so, false recognition in a phoneme level caused by a mismatch of the acoustic model can be prevented, with it being possible to improve sentence-level speech recognition accuracy. Also, an emotion type of the input speech is judged depending on the presence or absence of the sound source fluctuation, and a characteristic tone occurrence likelihood is computed using a speech recognition result. When the characteristic tone occurs in a part of the input speech where the characteristic tone is likely to occur, the emotion strength is judged as low. When the characteristic tone occurs in a part of the input speech where the characteristic tone is unlikely to occur, the emotion strength is judged as high. In this way, the speaker's emotion type and strength can be accurately recognized from the input speech, without being affected by individual and regional differences.

Moreover, the language model weight serves to determine the balance between the existing language model and acoustic model. Therefore, the feature parameter database can be generated with a smaller amount of data than when an acoustic model including a characteristic tone is generated. Speech recognition accuracy is low when an acoustic feature parameter database generated from expressionless voice data is used for a characteristic tone included in a speech having an emotional expression. However, by decreasing the acoustic model weight and increasing the language model weight for a part where the characteristic tone occurs in view of a possible mismatch of the acoustic model, speech recognition accuracy can be improved while suppressing an effect of using an inappropriate acoustic model. The improvement in speech recognition accuracy leads to an improvement in computation accuracy of a characteristic tone occurrence likelihood which is computed using a phoneme sequence. This in turn contributes to an improvement in computation accuracy of an emotion strength. Furthermore, by detecting a characteristic tone in units of phonemes and performing emotion recognition in units of phonemes, a change in emotion in the input speech can be followed on a phoneme basis. In interactive control and the like, this can be effectively used when specifying how the user, i.e. the speaker, reacts to an event in an interactive operation process and which event he or she reacts to.

Third Embodiment

Figure 17:
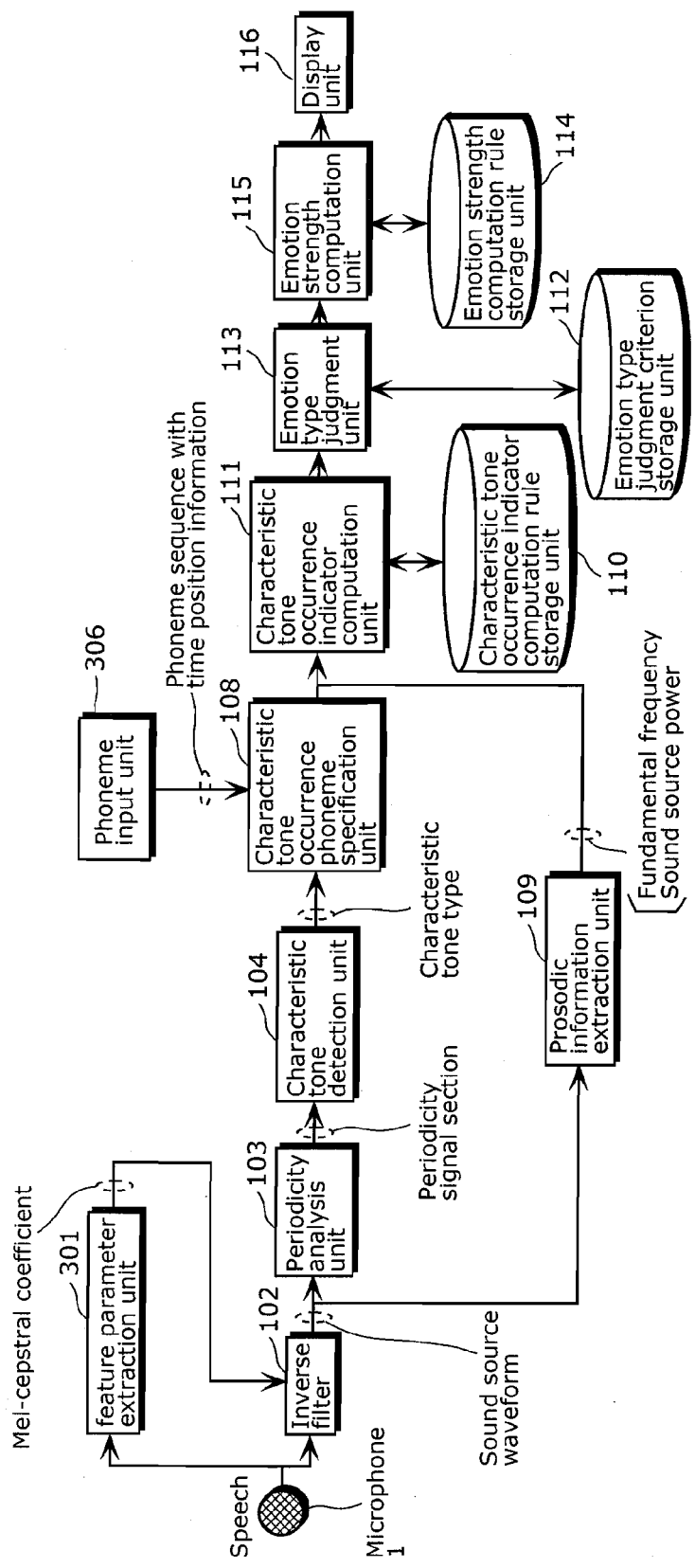
FIG. 17 is a functional block diagram showing a speech-based emotion recognition apparatus according to a third embodiment of the present invention.
Figure 18:
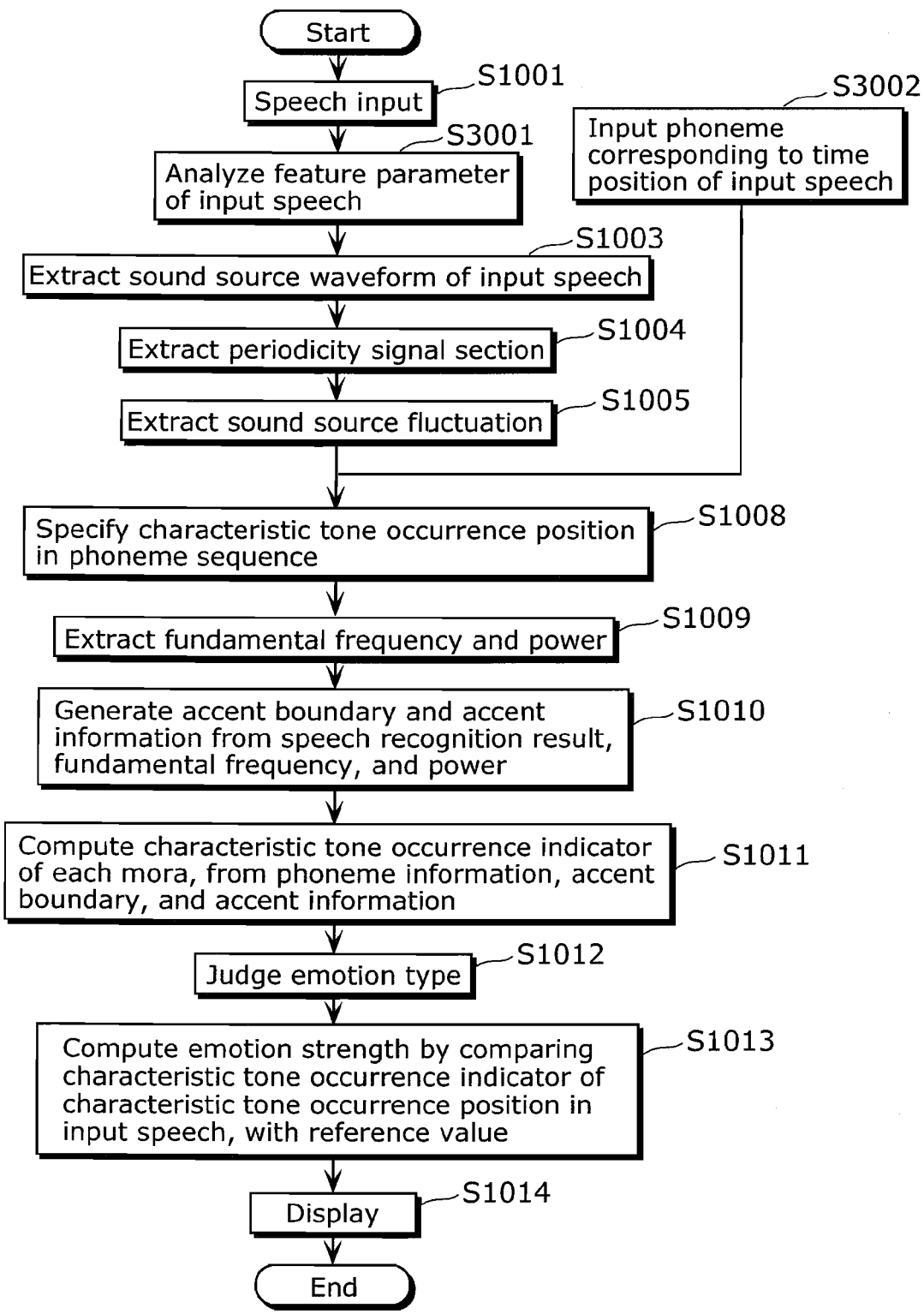
FIG. 18 is a flowchart showing an operation of the emotion recognition apparatus according to the third embodiment of the present invention.
Figure 19:
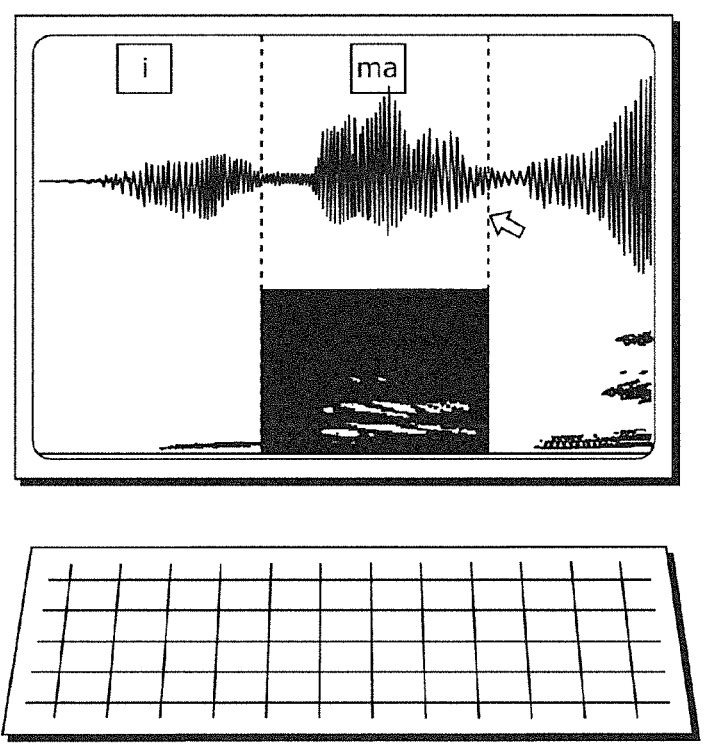
FIG. 19 shows one example of a phoneme input method according to the third embodiment of the present invention.
Figure 20:
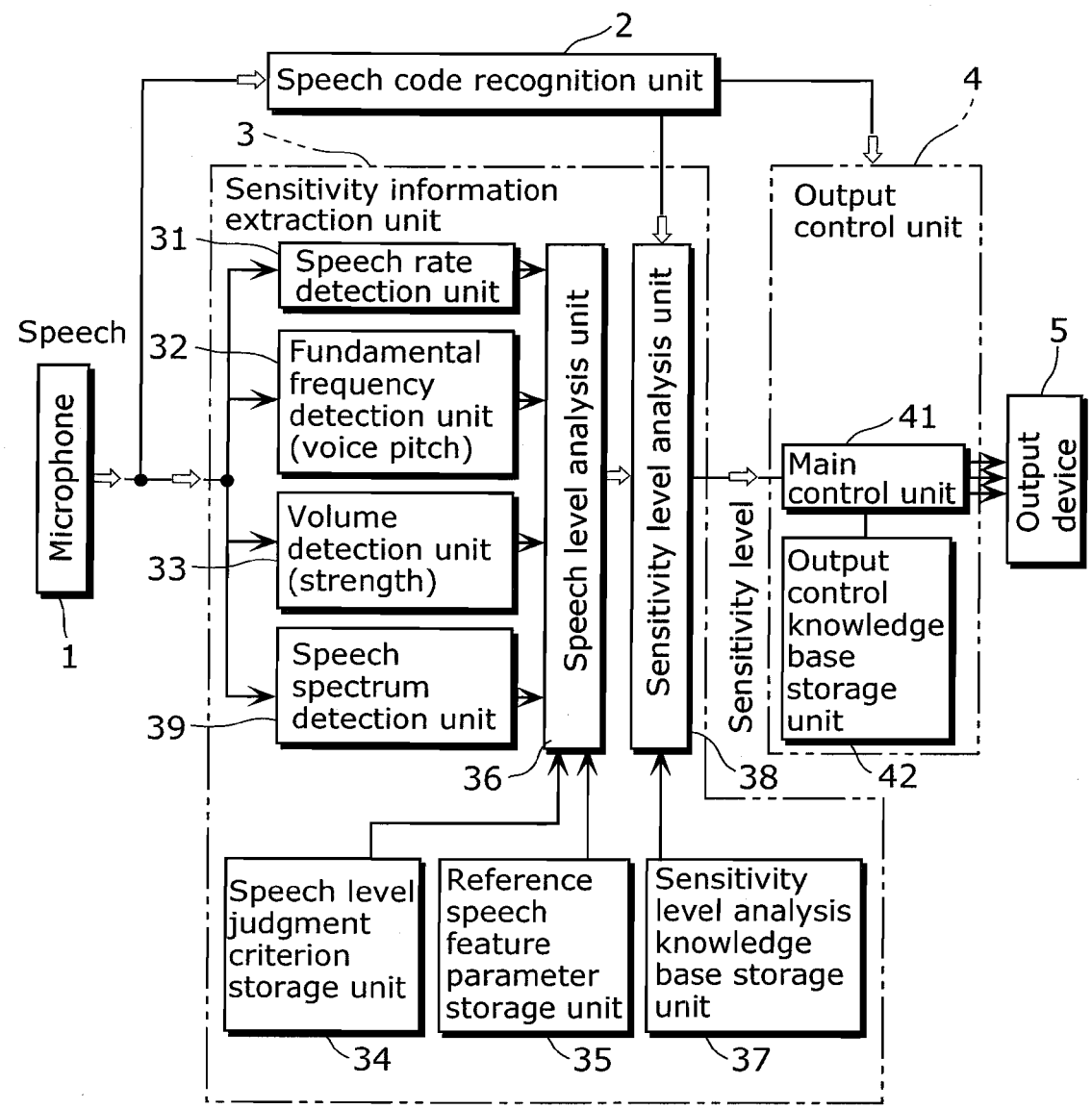
FIG. 20 is a block diagram showing a conventional speech-based emotion recognition apparatus.

FIG. 17 is a functional block diagram showing a speech-based emotion recognition apparatus according to a third embodiment of the present invention. FIG. 18 is a flowchart showing an operation of the emotion recognition apparatus according to the third embodiment. FIG. 19 shows one example of a phoneme input method according to the third embodiment.

In FIG. 17, only the parts that are different from FIG. 4 are described below, while omitting an explanation of the same parts as FIG. 4. In FIG. 18 too, only the parts that are different from FIG. 5 are described below, while omitting an explanation of the same parts as FIG. 5.

The emotion recognition apparatus shown in FIG. 17 has a similar structure to the one shown in FIG. 4, except that the speech recognition feature parameter extraction unit 101 in FIG. 4 has been replaced with a feature parameter extraction unit 301, the feature parameter database 105 and the switch 107 have been omitted, and the speech recognition unit 106 has been replaced with a phoneme input unit 306.

In FIG. 17, the emotion recognition apparatus is an apparatus for recognizing an emotion based on a speech, and includes the microphone 1, the feature parameter extraction unit 301, the inverse filter 102, the periodicity analysis unit 103, the characteristic tone detection unit 104, the phoneme input unit 306, the characteristic tone occurrence phoneme specification unit 108, the prosodic information extraction unit 109, the characteristic tone occurrence indicator computation rule storage unit 110, the characteristic tone occurrence indicator computation unit 111, the emotion type judgment criterion storage unit 112, the emotion type judgment unit 113, the emotion strength computation rule storage unit 114, the emotion strength computation unit 115, and the display unit 116.

The feature parameter extraction unit 301 is a processing unit that analyzes an input speech and extracts a parameter indicating a spectral envelope, such as a mel-cepstral coefficient.

The phoneme input unit 306 is an input unit that is used by the user to input a phoneme type corresponding to a specific section in an input waveform. For example, the phoneme input unit 306 is a pointing device such as a mouse or a pen tablet. The user designates a section using the pointing device, on a spectrogram or waveform of the input speech displayed on a screen. The user then inputs a phoneme type corresponding to the section, either by inputting the phoneme type via a keyboard or by selecting the phoneme type from a displayed phoneme type list using the pointing device.

The operation of the speech-based emotion recognition apparatus having the above structure is described below, with reference to FIG. 18.

First, a speech is inputted via the microphone 1 (Step S1001). The feature parameter extraction unit 301 analyzes the input speech, and extracts a mel-cepstral coefficient as an acoustic feature parameter representing spectral information (Step S3001). Next, the inverse filter 102 sets a parameter by inverse filtering the mel-cepstral coefficient generated in Step S3001, passes the speech signal inputted via the microphone in Step S1001, and extracts a sound source waveform (Step S1003).

The periodicity analysis unit 103 computes fundamentalness of the sound source waveform extracted in Step S1003 and, based on the fundamentalness, outputs a time region of a signal having periodicity in the input speech, as a periodicity signal section (Step S1004).

The characteristic tone detection unit 104 detects a fluctuation of the sound source waveform, in the periodicity signal section extracted by the periodicity analysis unit 103 in Step S1004 (Step S1005).

Meanwhile, the user inputs a phoneme type corresponding to a specific section of the input speech, via the phoneme input unit 306 (Step S3002). The phoneme input unit 306 outputs the section of the input speech and the corresponding phoneme type inputted by the user, to the characteristic tone occurrence phoneme specification unit 108 as a time position in the input speech and phoneme information corresponding to the time position.

The characteristic tone occurrence phoneme specification unit 108 specifies a phoneme at which a characteristic tone occurs in the input speech, from the phoneme sequence information accompanied by the time position information outputted from the phoneme input unit 306, and time position information of the characteristic tone in the input speech outputted from the characteristic tone detection unit 104 (Step S1008).

The prosodic information extraction unit 109 analyzes the sound source waveform outputted from the inverse filter 102, and extracts a fundamental frequency and sound source power (Step S1009).

The characteristic tone occurrence indicator computation unit 111 compares, based on the phoneme sequence accompanied by the time position information inputted in Step S3002 and information about the fundamental frequency and sound source power extracted by the prosodic information extraction unit 109, the rise and fall in a fundamental frequency pattern and a sound source power pattern with the phoneme sequence, and generates an accent boundary and accent information corresponding to the phoneme sequence (Step S1010).

The characteristic tone occurrence indicator computation unit 111 further computes a characteristic tone occurrence indicator for each phoneme in the phoneme sequence, by using the rule, stored in the characteristic tone occurrence indicator computation rule storage unit 110, for computing a characteristic tone occurrence likelihood from a phoneme attribute such as a consonant, a vowel, a position in an accent phrase, and a relative position from an accent nucleus (Step S1011).

The emotion type judgment unit 113 specifies a characteristic tone occurrence type in the input speech, based on the characteristic tone occurrence position generated by the characteristic tone occurrence phoneme specification unit 108 and shown in units of phonemes. The emotion type judgment unit 113 references the information in the emotion type judgment criterion storage unit 112, and specifies an emotion type in the phoneme at which the characteristic tone occurs in the input speech (Step S1012).

The emotion strength computation unit 115 references the rule stored in the emotion strength computation rule storage unit 114, and computes an emotion strength for each phoneme (Step S1013). This enables a change in emotion strength to be detected in more detail than in the emotion judgment of Step S1012. The display unit 116 displays the emotion strength of each phoneme computed and outputted by the emotion strength computation unit 115 in Step S1013 (Step S1014).

This embodiment describes the case where the emotion type is specified for each phoneme according to the emotion type judgment criterion stored in the emotion type judgment criterion storage unit 112 in Step S1012 and then the emotion strength is computed for each phoneme according to the rule stored in the emotion strength computation rule storage unit 114 in Step S1013. However, this can be modified as in the variation of the first embodiment, such that the characteristic tone occurrence indicator is computed for each phoneme and then the emotion type and strength of the entire speech are determined based on a result of the computation.

According to the above structure, a sound source fluctuation is extracted from an input speech as a characteristic tone that reflects an emotion. Meanwhile, a phoneme type corresponding to a specific section of the input speech is inputted. A characteristic tone occurrence likelihood obtained from a phoneme sequence and prosodic information is compared with the presence or absence of the sound source fluctuation in the actual input speech. When the characteristic tone occurs in a part of the input speech where the characteristic tone is likely to occur, the emotion strength is judged as low. When the characteristic tone occurs in a part of the input speech where the characteristic tone is unlikely to occur, the emotion strength is judged as high. In this way, the speaker's emotion type and strength can be accurately recognized from the input speech, without being affected by individual and regional differences.

Suppose a speech that is made up of phonemes with a tendency of having high characteristic tone occurrence indicators and spoken with the characteristic tone (for example, a speech which is made up of phonemes of the "t", "k", and "d" consonants followed by the "a", "e", and "o" vowels, and is likely to be spoken with a pressed voice), and a speech that is made up of phonemes with a tendency of having low characteristic tone occurrence indicators and spoken with the characteristic tone (for example, a speech which is made up of phonemes of the "h" and "s" consonants followed by the "i" and "u" vowels) are inputted to the emotion recognition apparatus in the present application, where the two speeches have identical prosodic information. By comparing judgment results of emotion types and strengths of the two speeches, it can be confirmed that a characteristic tone occurrence indicator is computed using a phoneme type and prosodic information as parameters and an emotion type and strength are estimated based on the characteristic tone occurrence indicator. Also, suppose a speech in which a same phoneme spoken with a characteristic tone appears continuously, is inputted to the emotion recognition apparatus in the present application, with an accent position being shifted by one phoneme at a time. By checking a change in emotion strength caused by the movement of the accent position, it can be confirmed that a characteristic tone occurrence indicator is computed using a phoneme type and prosodic information as parameters and an emotion type and strength are estimated based on the characteristic tone occurrence indicator.

The first embodiment and its variation, the second embodiment, and the third embodiment describe the case where the speech-based emotion recognition apparatus performs processing after acquiring the entire input speech. Alternatively, processing may be sequentially performed on voices inputted via the microphone 1. In the first embodiment and its variation, such sequential processing is performed in units of phonemes that are a processing unit of speech recognition. In the second embodiment, such sequential processing is performed in units of clauses or phrases that can be subjected to language processing.

The first embodiment and its variation, the second embodiment, and the third embodiment describe the case where the sound source waveform is obtained by mel-cepstral inverse filtering. However, the sound source waveform may be obtained by methods other than the mel-cepstral inverse filtering, such as a method of finding a vocal tract transfer characteristic based on a vocal tract model and inverse filtering the vocal tract transfer characteristic to obtain the sound source waveform, and a method of obtaining the sound source waveform based on a sound source waveform model.

The first embodiment and its variation, the second embodiment, and the third embodiment describe the case where the mel-cepstral parameter is used for the acoustic feature model of speech recognition, but other speech recognition methods are equally applicable. In this case, the sound source waveform may be obtained by using either mel-cepstral inverse filtering or by other methods.

The first embodiment and its variation, the second embodiment, and the third embodiment describe the case where the sound source frequency fluctuation and the sound source high frequency component fluctuation are detected as the characteristic tones of a pressed voice and a husky voice. However, characteristic tones other than a pressed voice and a husky voice, such as a falsetto voice and a strained voice, that are listed in Hideki Kasuya & Chang-Sheng Yang "Voice Quality Associated with Voice Source" in *The Journal of the Acoustical Society of Japan*, vol. 51, no. 11 (1995), pp. 869 to 875, may also be detected based on a sound source amplitude fluctuation and the like.

The first embodiment and its variation, the second embodiment, and the third embodiment describe the case where the extraction of the fundamental frequency and the sound source power is performed immediately before Step S1009 when the characteristic tone occurrence indicator computation unit 111 determines the accent phrase boundary and the accent position. However, the extraction of the fundamental frequency and the sound source power may be performed at any timing, so long as it is after Step S1003 when the inverse filter 102 generates the sound source waveform and before Step S1010 when the characteristic tone occurrence indicator computation unit 111 determines the accent phrase boundary and the accent position.

The first embodiment and its variation, the second embodiment, and the third embodiment describe the case where the characteristic tone occurrence indicator computation unit 111 uses quantization II as the statistical learning method, and a consonant, a vowel, a position in an accent phrase, and a relative position from an accent nucleus as explanatory variables. However, the statistical learning method is not limited to this. Also, the explanatory variables are not limited to the above attributes. For example, the characteristic tone occurrence indicator may be computed using a continuous value such as a fundamental frequency or power and a pattern of the fundamental frequency or power, and a time length of a phoneme.

The first embodiment and its variation, the second embodiment, and the third embodiment describe the case where a speech is inputted via the microphone 1, but a speech recorded beforehand or a speech signal inputted from outside the apparatus is also applicable.

The first embodiment and its variation, the second embodiment, and the third embodiment describe the case where the recognized emotion type and strength are displayed by the display unit 116, but the recognized emotion type and strength may also be recorded to a storage device or outputted to outside the apparatus.

The speech-based emotion recognition apparatus according to the present invention recognizes an emotion or attitude of a speaker, by detecting a voice with a characteristic tone that appears in an input speech according to tension or relaxation of a vocal organ, or an emotion, an expression, or a speaking style. Such a speech-based recognition apparatus is useful as a voice interactive interface of a robot and the like. The speech-based emotion recognition apparatus is also applicable for use in an automatic telephone answering system of a call center, a telephone exchange center, and the like. Furthermore, the speech-based emotion recognition apparatus is applicable, for example, to a mobile terminal which includes an application for changing an operation of a character image based on a tone of a voice so that the operation or expression of the character image can be changed in accordance with a change in emotion appearing in a speech.

The invention claimed is:

1. An emotion recognition apparatus that recognizes an emotion of a speaker from an input speech, comprising:
   a non-transitory memory device configured to store a program that is executable by a processor, which causes the emotion recognition apparatus to operate as the following:
   a characteristic tone detection unit configured to detect, from a plurality of characteristic tones, a characteristic tone that corresponds to the input speech and relates to a specific emotion;
   a speech recognition unit configured to recognize types of phonemes included in the input speech, based on the characteristic tone detected by the characteristic tone detection unit;
   a characteristic tone occurrence indicator computation unit configured to compute, for each of the characteristic tones, a characteristic tone occurrence indicator for each of the phonemes, based on the types of the phonemes recognized by the speech recognition unit, in accordance with a rule which predetermines a relationship between a position of each of the phonemes and the characteristic tone occurrence indicator indicating a likelihood of the phoneme being spoken with the characteristic tone at the position; and
   an emotion judgment unit configured to (i) judge a type of the emotion of the speaker in a phoneme at which the characteristic tone occurs in the input speech, from the characteristic tone occurrence indicator computed by the characteristic tone occurrence indicator computation unit and a type of the characteristic tone detected by the characteristic tone detection unit, in accordance with a criterion for judging the type of the emotion based on a combination of a type of the characteristic tone and the characteristic tone occurrence indicator for each phoneme and an adjacent one of the phonemes, and to (ii) judge a strength of the emotion of the speaker in the phoneme at which the characteristic tone occurs in the input speech, using the characteristic tone occurrence indicator computed by the characteristic tone occurrence indicator computing unit, in accordance with a rule that indicates for each type of the emotion that the emotion is high in strength when the characteristic tone occurrence indicator corresponding to the type of the emotion is in a first range, the emotion is medium in strength when the characteristic tone occurrence indicator is in a second range higher than the first range, and the emotion is weak in strength when the characteristic tone occurrence indicator is in a third range higher than the second range,
   wherein the strength of the emotion of the speaker determined by the characteristic tone occurrence indicator based on a frequency of occurrence of the phoneme in the input speech for which the corresponding characteristic tone is recognized.

2. The emotion recognition apparatus according to claim 1, wherein the emotion strength judgment unit is configured to judge, using a characteristic tone occurrence indicator of a phoneme corresponding to a time position at which the characteristic tone detected by the characteristic tone detection unit occurs in the input speech, the strength of the specific emotion of the speaker in the phoneme at which the characteristic tone occurs, in accordance with the rule that indicates that the emotion is high in strength when the characteristic tone occurrence indicator is in the first range, the emotion is medium in strength when the characteristic tone occurrence indicator is in the second range, and the emotion is weak in strength when the characteristic tone occurrence indicator is in the third range, the characteristic tone occurrence indicator being included in the characteristic tone occurrence indicator computed for each of the phonemes, which corresponds to the characteristic tone detected by the characteristic tone detection unit, among a plurality of characteristic tone occurrence indicators computed by the characteristic tone occurrence indicator computation unit.

3. The emotion recognition apparatus according to claim 1, wherein the characteristic tone detection unit is configured to detect a tone of a voice whose vowel part has a fluctuation in a sound source, as the characteristic tone.

4. The emotion recognition apparatus according to claim 1, further comprising:
   at least a feature parameter database storing a feature parameter of a voice which includes the characteristic tone, for each phoneme type, wherein the speech recognition unit is configured to recognize the types of the phonemes included in the input speech, based on the feature parameter database.

5. The emotion recognition apparatus according to claim 4, wherein the feature parameter database includes:
a first database storing a feature parameter of a voice which includes at least one characteristic tone including the characteristic tone, for each phoneme type; and
a second database storing a feature parameter of a voice which includes no characteristic tone, for each phoneme type,
the emotion recognition apparatus further comprises:
a selection unit configured to select a database corresponding to a result of the detection by the characteristic tone detection unit, from the first database and the second database, and
the speech recognition unit is configured to recognize the types of the phonemes included in the input speech, based on the database selected by the selection unit.

6. The emotion recognition apparatus according to claim 1, further comprising:
an acoustic feature parameter database storing an acoustic feature parameter for each phoneme type; and
a language feature parameter database storing a language feature parameter which represents a word dictionary including at least one of a reading and a pronunciation symbol,
wherein the speech recognition unit is configured to recognize the types of the phonemes included in the input speech based on the acoustic feature parameter database and the language feature parameter database by, for a word in which the characteristic tone is detected, decreasing a weight of the acoustic feature parameter included in the acoustic feature parameter database and increasing a weight of the language feature parameter included in the language feature parameter database.

7. An emotion recognition apparatus that recognizes an emotion of a speaker from an input speech, comprising:
a non-transitory memory device configured to store a program that is executable by a processor, which causes the emotion recognition apparatus to operate as the following:
a characteristic tone detection unit configured to detect, from a plurality of characteristic tones, a characteristic tone that corresponds to the input speech and relates to a specific emotion;
a phoneme input unit configured to input types of phonemes included in the input speech;
a characteristic tone occurrence indicator computation unit configured to compute, for each of the characteristic tones, a characteristic tone occurrence indicator for each of the phonemes, by using at least the types of the phonemes inputted by the phoneme input unit as parameters, in accordance with a rule which predetermines a relationship between a position of each of the phonemes and the characteristic tone occurrence indicator indicating a likelihood of the phoneme being spoken with the characteristic tone at the position; and
an emotion judgment unit configured to (i) judge a type of the emotion of the speaker in a phoneme at which the characteristic tone occurs in the input speech, from the characteristic tone occurrence indicator computed by the characteristic tone occurrence indicator computation unit and a type of the characteristic tone detected by the characteristic tone detection unit, in accordance with a criterion for judging the type of the emotion based on a combination of a type of the characteristic tone and the characteristic tone occurrence indicator for each phoneme and an adjacent one of the phonemes, and to (ii) judge a strength of the emotion of the speaker in the phoneme at which the characteristic tone occurs in the input speech, using the characteristic tone occurrence indicator computed by the characteristic tone occurrence indicator computation unit, in accordance with a rule that indicates for each type of the emotion that the emotion is high in strength when the characteristic tone occurrence indicator corresponding to the type of the emotion is in a first range, the emotion is medium in strength when the characteristic tone occurrence indicator is in a second range higher than the first range, and the emotion is weak in strength when the characteristic tone occurrence indicator is in a third range higher than the second range,
wherein the strength of the emotion of the speaker determined by the characteristic tone occurrence indicator based on a frequency of occurrence of a phoneme in the input speech for which a type of phoneme is recognized.

8. An emotion recognition apparatus that recognizes an emotion of a speaker from an input speech, comprising:
a non-transitory memory device configured to store a program that is executable by a processor, which causes the emotion recognition apparatus to operate as the following:
a speech recognition unit configured to recognize types of phonemes included in the input speech;
a characteristic tone detection unit configured to extract, from the input speech, a pressed speech portion whose vowel part has an amplitude fluctuation or a frequency fluctuation in a sound source; and
an emotion judgment unit configured to judge, for each of the phonemes recognized by the speech recognition unit, that an emotion of the speaker is stronger in anger in a case where the pressed speech portion detected by the characteristic tone detection unit is a phoneme including at least one of an unvoiced labial plosive, an unvoiced dental affricate, and an unvoiced labio-dental fricative,
wherein the strength of the emotion of the speaker is based on a frequency of occurrence of a phoneme in the input speech for which a type of phoneme is recognized.

9. An emotion recognition method for recognizing an emotion of a speaker from an input speech, comprising:
a characteristic tone detection step of detecting, from a plurality of characteristic tones, a characteristic tone that corresponds to the input speech and relates to a specific emotion;
a speech recognition step of recognizing types of phonemes included in the input speech, based on the characteristic tone detected in the characteristic tone detection step;
a characteristic tone occurrence indicator computation step of computing, for each of the characteristic tones, a characteristic tone occurrence indicator for each of the phonemes, based on the types of the phonemes recognized in the speech recognition step, in accordance with a rule which predetermines a relationship between a position of each of the phonemes and the characteristic tone occurrence indicator indicating a likelihood of the phoneme being spoken with the characteristic tone at the position; and
an emotion judgment step of (i) judging a type of the emotion of the speaker in a phoneme at which the characteristic tone occurs in the input speech, from the characteristic tone occurrence indicator computed in the characteristic tone occurrence indicator computation step and a type of the characteristic tone detected in the characteristic tone detection step, in accordance with a criterion for judging the type of the emotion based on a combination of a type of the characteristic tone and the characteristic tone occurrence indicator for each phoneme and an adjacent one of the phonemes, and (ii) judging a strength of-the emotion of the speaker in the phoneme at which the characteristic tone occurs in the input speech, using the characteristic tone occurrence indicator computed in the characteristic tone occurrence indicator computing step, in accordance with a rule that indicates for each type of the emotion that the emotion is high in strength when the characteristic tone occurrence indicator corresponding to the type of the emotion is in a first range, the emotion is medium in strength when the characteristic tone occurrence indicator is in a second range higher than the first range, and the emotion is weak in strength when the characteristic tone occurrence indicator is in a third range higher than the second range, wherein the strength of the emotion of the speaker determined by the characteristic tone occurrence indicator based on a frequency of occurrence of the phoneme in the input speech for which the corresponding characteristic tone is recognized.

10. A non-transitory computer-readable recording medium program for recognizing an emotion of a speaker from an input speech, the program causing a computer to execute:

a characteristic tone detection step of detecting, from a plurality of characteristic tones, a characteristic tone that corresponds to the input speech and relates to a specific emotion;

a speech recognition step of recognizing types of phonemes included in the input speech, based on the characteristic tone detected in the characteristic tone detection step;

a characteristic tone occurrence indicator computation step of computing, for each of the characteristic tones, a characteristic tone occurrence indicator for each of the phonemes, based on the types of the phonemes recognized in the speech recognition step, in accordance with a rule which predetermines a relationship between a position of each of the phonemes and the characteristic tone occurrence indicator indicating a likelihood of the phoneme being spoken with the characteristic tone at the position; and an emotion judgment step of (i) judging a type of the emotion of the speaker in a phoneme at which the characteristic tone occurs in the input speech, from the characteristic tone occurrence indicator computed in the characteriistic tone occurrence indicator computation step and a type of the characteristic tone detected in the characteristic tone detection step, in accordance with a criterion for judging the type of the emotion based on a combination of a type of the characteristic tone and the characteristic tone occurrence indicator for each of one and an adjacent one of the phonemes, and (ii) judging a strength of-the emotion of the speaker in the phoneme at which the characteristic tone occurs in the input speech, using the characteristic tone occurrence indicator computed in the characteristic tone occurrence indicator computing step, in accordance with a rule indicates for each type of the emotion that the emotion is high in strength when the characteristic tone occurrence indicator corresponding to the type of the emotion is in a first range, the emotion is medium in strength when the characteristic tone occurrence indicator is in a second range higher than the first range, and the emotion is weak in strength when the characteristic tone occurrence indicator is in a third range higher than the second range, wherein the strength of the emotion of the speaker determined by the characteristic tone occurrence indicator based on a frequency of occurrence of the phoneme in the input speech for which the corresponding characteristic tone is recognized.

* * * * *